(12) United States Patent
Ferlitsch et al.

(10) Patent No.: US 7,936,472 B2
(45) Date of Patent: May 3, 2011

(54) DRIVERLESS IMAGE PRINTING

(75) Inventors: Andrew Rodney Ferlitsch, Camas, WA (US); Roy K. Chrisop, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1204 days.

(21) Appl. No.: 11/559,996

(22) Filed: Nov. 15, 2006

(65) Prior Publication Data

US 2008/0112013 A1    May 15, 2008

(51) Int. Cl.
G06F 15/00 (2006.01)
G06K 1/00 (2006.01)
(52) U.S. Cl. ............... 358/1.15; 358/1.9; 358/1.13
(58) Field of Classification Search .......... 358/1.1, 358/1.9, 1.11, 1.12, 1.13, 1.14, 1.15, 1.16, 358/1.17, 1.18, 1.5
See application file for complete search history.

(56) References Cited

U.S. PATENT DOCUMENTS

| | | | |
|---|---|---|---|
| 6,061,142 A | 5/2000 | Shim | |
| 2002/0140958 A1 | 10/2002 | Lester | |
| 2002/0186393 A1 | 12/2002 | Pochuev et al. | |
| 2003/0011814 A1 | 1/2003 | Nunokawa et al. | |
| 2003/0095284 A1 | 5/2003 | Parry | |
| 2003/0137693 A1 | 7/2003 | Nishio | |
| 2003/0142334 A1 | 7/2003 | Currans et al. | |
| 2004/0012813 A1 | 1/2004 | Wu et al. | |
| 2004/0098410 A1* | 5/2004 | Ozawa | 707/104.1 |
| 2004/0160632 A1 | 8/2004 | Kato et al. | |
| 2004/0184078 A1 | 9/2004 | Endo et al. | |
| 2005/0024499 A1 | 2/2005 | Luciano et al. | |
| 2005/0052674 A1* | 3/2005 | Hurtz et al. | 358/1.13 |
| 2006/0290963 A1* | 12/2006 | Sakuraba et al. | 358/1.13 |

FOREIGN PATENT DOCUMENTS

| | | |
|---|---|---|
| EP | 1 156 409 A2 | 11/2001 |
| EP | 1 267 254 A2 | 12/2002 |
| EP | 1 338 952 A2 | 8/2003 |
| JP | 06-215088 | 8/1994 |
| JP | 2002244821 A | 8/2002 |
| JP | 2006-227908 | 8/2006 |
| JP | 2006-289907 | 10/2006 |

OTHER PUBLICATIONS

Sharp ARM277 Product Brochure.[online],[retrieved on Sep. 19, 2006] Retrieved from Internet using <URL:http://www.uoesharp.com/pdf/PRODUCTS/SHARP/arM277.pdf>.
Decision to Grant a Patent for Japanese Patent Application No. 2007-258817 dispatch date Feb. 2, 2010.

* cited by examiner

*Primary Examiner* — Thierry L Pham
(74) *Attorney, Agent, or Firm* — Michael Blaine Brooks, PC; Pejman Yedidsion; David Ripma

(57) ABSTRACT

The embodiments of the present invention provide for a direct submit application module adapted to process image-only portable document format (PDF) documents, encrypted PDF documents, and image documents. The DSA, based on an output device's features or capabilities, adaptively performs host-based emulation so as to provide users with an expanded set of features, which may not be supported by an output device. In some embodiments, the DSA may perform an image-bypass PDF processing, perform processing on an image document so as to provide an expanded set of image formats, and/or perform decryption, if appropriate, on encrypted PDF documents.

16 Claims, 19 Drawing Sheets

DRIVERLESS IMAGE PRINTING

FIELD OF THE INVENTION

The embodiments of the present invention relate to output processing, particularly to driverless printing of portable document format (PDF) documents and image documents.

BACKGROUND

Various printers have various printer capabilities. Some printers are adapted to directly accept a print job, i.e., driverless without printer drivers. Others are adapted to directly accept a print job of a certain image format, while others are adapted to decrypt an encrypted file. A way to adapt to a printer's capabilities is highly desirable to provide printer and printing flexibility.

SUMMARY

In one aspect of the invention, a method of processing by a host is provided. The method includes the steps of receiving an image-only PDF document comprising at least one embedded portable document format (PDF) image with an embedded PDF image format, wherein the image-only PDF document is directed to an imaging device; determining a set of capabilities associated with the imaging device; based on the determined set of capabilities, if the imaging device is adapted to support a device-based image-only PDF process adapted to process image-only PDF documents, then transmitting to the imaging device the image-only PDF document for rendering by the imaging device; and otherwise, if the imaging device is not adapted to support the device-based image-only PDF process but adapted to support an image document format compatible with the embedded PDF image format, then performing the following steps: transforming the at least one embedded PDF image of the image-only PDF document into a transformed image document with the image document format compatible with the embedded PDF image format; and transmitting to the imaging device the transformed image document with the image document format compatible with the embedded PDF image format, for rendering by the imaging device.

In another aspect of the invention, another method of processing by a host is provided. The method includes the steps of receiving an image document with an image document format, wherein the image document is directed to an imaging device; determining a set of capabilities associated with the imaging device; based on the determined set of capabilities, if the imaging device is adapted to support the image document format of the image document, then transmitting to the imaging device the image document; and otherwise, if the imaging device is not adapted to support the image document format of the image document but adapted to support an alternate image document format which is also adapted to be converted at the host, then performing the following steps: transforming the image document to a transformed image document with the alternate image format; and transmitting to the imaging device the transformed image document with the alternate image format, for rendering by the imaging device.

In another aspect of the invention, a method of processing by a host is provided. The method includes the steps of receiving an input document directed to an imaging device; determining a set of capabilities associated with the imaging device; and determining if the input document is one of the following: an image-only PDF document with at least one embedded PDF image with an embedded PDF image format and an image document with an image document format. The method further includes the steps of, if the input document is determined as an image-only PDF document then based on the determined set of capabilities, if the imaging device is adapted to support a device-based image-only PDF process adapted to process image-only PDF documents, then transmitting to the imaging device the input document for rendering by the imaging device; otherwise, if the imaging device is not adapted to support the device-based image-only PDF process but adapted to support an image document format compatible with the embedded PDF image format of the input document, then performing the following steps: transforming the at least one embedded PDF image of the input document into a transformed image document with the image document format compatible with the embedded PDF image format of the input document; and transmitting to the imaging device the transformed image document with the image document format compatible with the embedded PDF image format, for rendering by the imaging device. The method further includes the steps of, if the input document is determined as an image document then based on the determined set of capabilities, if the imaging device is adapted to support the image document format of the input document, then transmitting to the imaging device the input document; otherwise, if the imaging device is not adapted to support the image document format of the input document but adapted to support an alternate image document format which is also adapted to be converted at the host, then performing the following steps: transforming the input document to a transformed image document with the alternate image format; and transmitting to the imaging device the transformed image document with the alternate image format, for rendering by the imaging device.

In another aspect of the invention, a device is provided. The device includes a receiver module, a capability query module, and a direct submit application module (DSA). The receiver module is adapted to receive an input document directed to an imaging device and determine if the input document is one of the following: an image-only PDF document with at least one embedded PDF image with an embedded PDF image format and an image document with an image document format. The capability query module is adapted to determine a set of capabilities associated with the imaging device. The DSA is adapted to transmit to the imaging device the input document, if the input document is determined as an image-only PDF document and, based on the determined set of capabilities, if the imaging device is adapted to support a device-based image-only PDF process adapted to process image-only PDF documents. The DSA, on the other hand, is adapted to, if the input document is determined as an image-only PDF document, transform the at least one embedded PDF image of the input document into a transformed image document with the image document format compatible with the embedded PDF image format of the input document, and transmit to the imaging device the transformed image document with the image document format compatible with the embedded PDF image format—if, based on the determined set of capabilities, the imaging device is not adapted to support the device-based image-only PDF process but adapted to support an image document format compatible with the embedded PDF image format of the input document. The DSA is also further adapted to, if the input document is determined as an image document, transmit to the imaging device the input document—if the imaging device, based on the determined set of capabilities, is adapted to support the image document format of the input document. The DSA, on the other hand, is adapted to, if the input document is determined as an image document, transform the input document to a transformed image document with the alternate image format and transmit to the imaging device the transformed image document with the alternate image format—if the imaging device, based on the determined set of capabilities, is not adapted to support the image document format of the input document but adapted to support an alternate image document format which is also adapted to be converted by the DSA.

BRIEF DESCRIPTION OF THE DRAWINGS

The present invention is illustrated by way of example and not limitation in the figures of the accompanying drawings, and in which.

DETAILED DESCRIPTION

Figure 1:
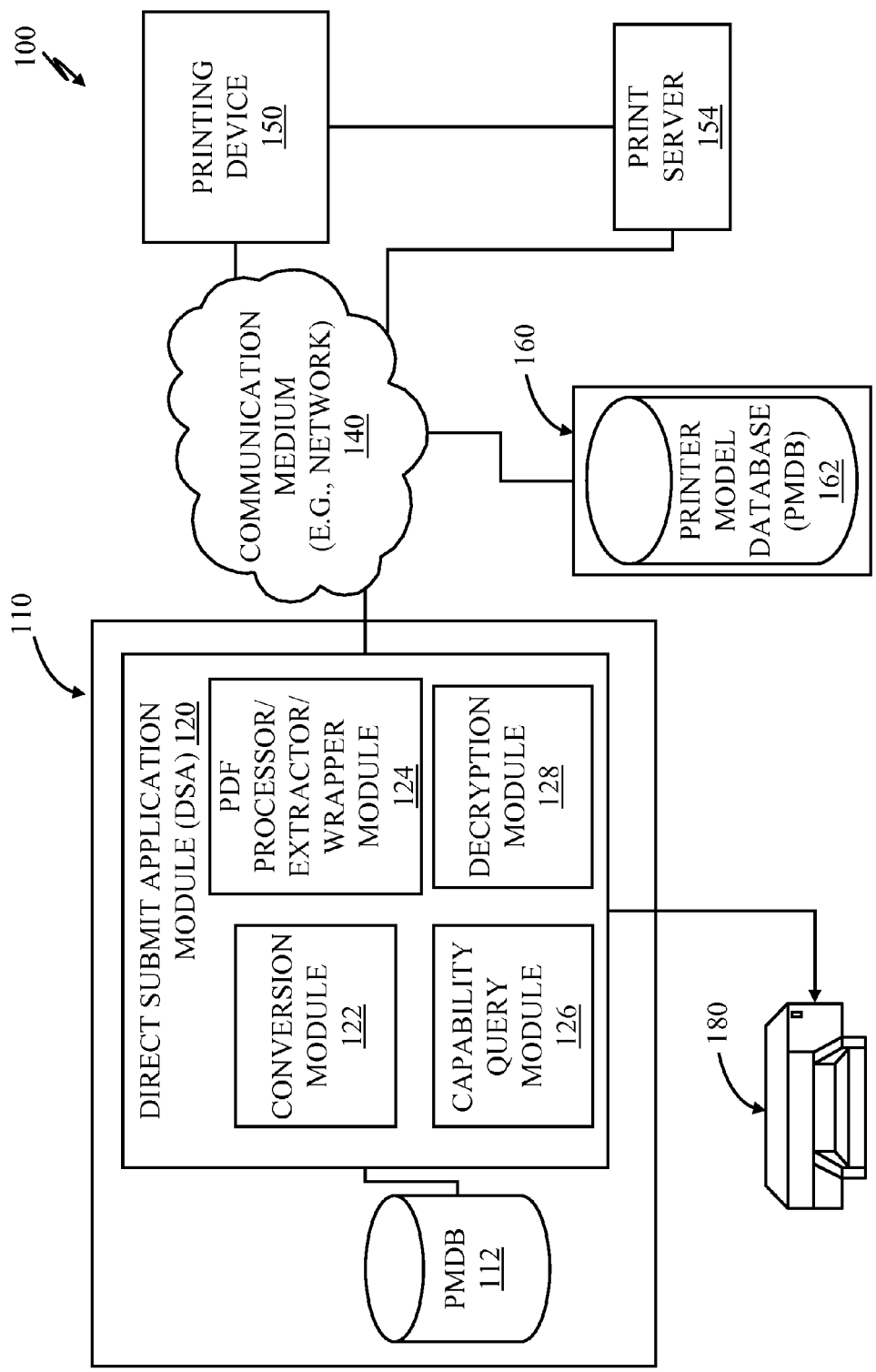
FIG. 1 is a high-level block diagram of an exemplary system according to an embodiment of the invention.
Figure 2:
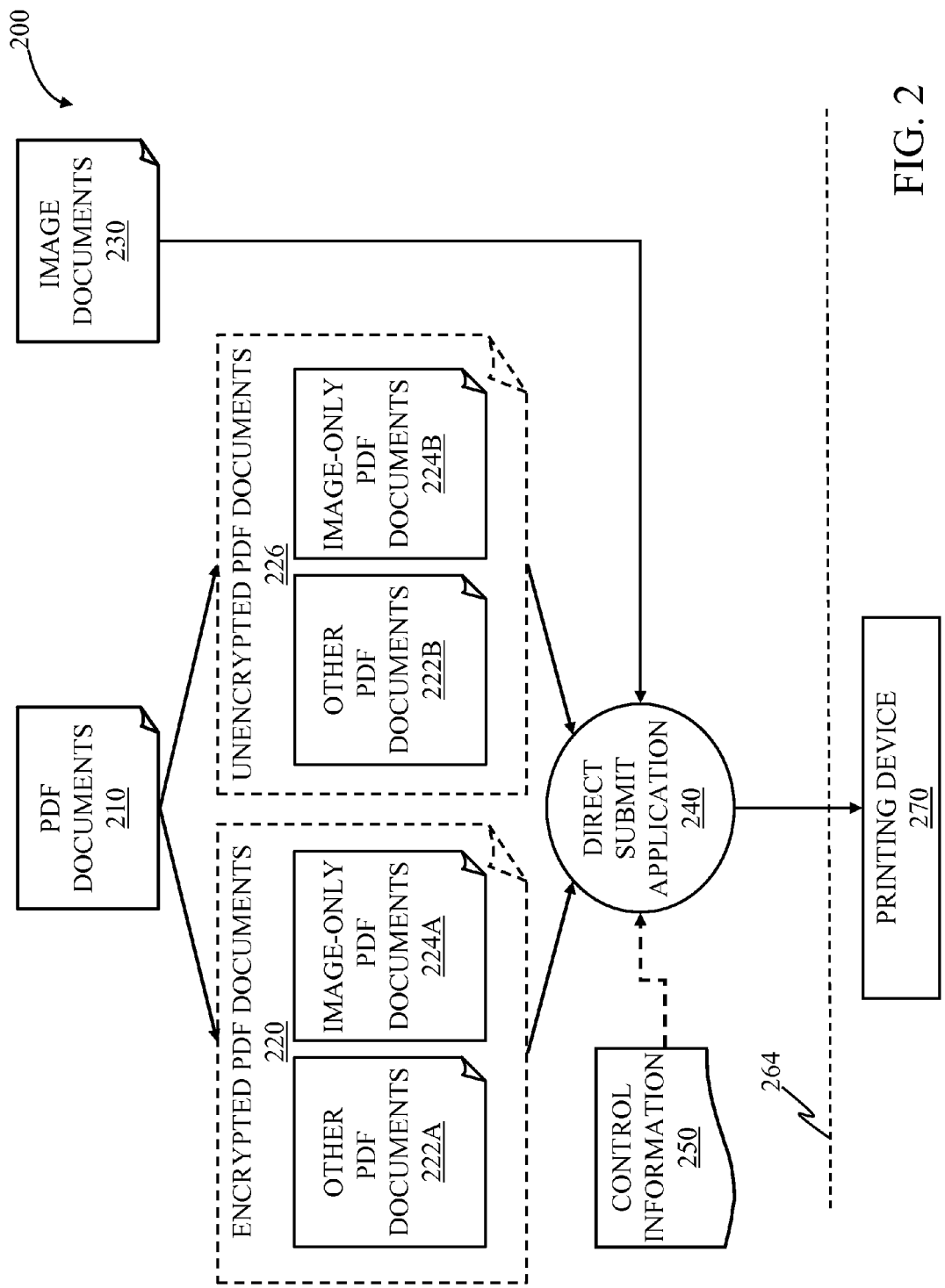
FIG. 2 is a high-level block diagram of exemplary file formats that may be processed by an exemplary direct submit application module, according to an embodiment of the invention.

To better understand the figures, reference numerals within the one hundred series, for example, 120 and 112, are initially introduced in FIG. 1, reference numerals in the two hundred series, for example, 210 and 230, are initially introduced in FIG. 2, and so on and so forth. So, reference numerals in the nine hundred series, e.g., 940 and 956, are initially introduced in FIG. 9.

The embodiments of the present invention generally relate to a direct print architecture that typically bypasses printer driver processing at the host or client. Generally, the embodiments relate to image processing, including rendering and printing, of portable document format (PDF) documents and image documents. A document submitted for printing is typically processed by a direct submit application module (DSA) that may perform adaptive processes prior to transmission of the document to the printer. Furthermore, the embodiments of the present invention provide exemplary methods and modules adapted to determine the capabilities of an imaging device, including the capability of directly supporting formats and certain modes of operations. Based on the set of capabilities of the device, a document submitted for printing, for example, by a user is processed by the DSA so as to take advantage of the available capabilities of the imaging device. Although the embodiments of the present invention are discussed in relation to printers and to the printing process, in general, the embodiments of the present invention may also apply to other output processing systems, methods, and devices, such as, but not limited to, facsimile devices, display devices, scanners, and copiers. Other imaging operations may include faxing, web publishing, and document conversions.

FIG. 1 is an exemplary system 100 according to an embodiment of the invention. The system 100 typically includes a computing device 110, e.g., a general-purpose computer. In some embodiments, the computing device 110 is directly attached, e.g., via a serial or parallel bus, to one or more imaging devices 180, e.g., peripherals—which may include printers, copiers, facsimile machines, and/or scanners. Typically via the computing device 110, a user is enabled to submit documents—which may include files, via the direct submit application module (DSA) 120, to such devices 180 for output, such as printing and/or faxing, for example. The computing device 110 may also be part of a local area network 140, such that the computing device 110 is adapted to communicate with other printing devices 150 operably coupled to such a network 140. In some embodiments, interposed between the computing device 110 and the printing device 150 is a print server 154. The exemplary network 140 may include wired, wireless, or both network segments, which may include broadcast. The computing device 110 may also be operably coupled to a wide area network, not shown, such as the Internet, for example, via the network 140 and an appropriate gateway and/or router device, such as known to those of ordinary skill in the art.

The computing device 110 typically includes a direct submit application module (DSA) 120. The DSA 120 is adapted to receive and transmit documents to printing devices 150, 180 for printing. The DSA 120 may include a conversion module 122, a portable document format (PDF) processor, extractor, and wrapper module (PDF processor module) 124, a capability query module 126, and a decryption module 128. The DSA may also include a receiver module (not shown) adapted to receive documents. The PDF processor module 124 is adapted to read documents, including files or portions thereof, formatted or supporting the ADOBE® PDF specification, extract embedded PDF images from image-only PDF documents, and package or encode image documents as image-only PDF documents. PDF is a well-known standard or specification for electronic document distribution from ADOBE®. The conversion module 122 is generally adapted to convert an image from one image file format to another. The capability query module 126 is generally adapted to determine a printer's capabilities. The decryption module 128 is generally adapted to decrypt encrypted PDF documents. One of ordinary skill in the art will appreciate that the different modules 122, 124, 126, 128 embodied within the DSA 120 may be embodied as modules separate from the DSA 120. Furthermore, some or all of the modules 122-128 may be combined, or the modules may be further subdivided, and still be in the scope of the present invention. Furthermore, other modules not shown may be incorporated as part of the exemplary DSA 120. For example, a document receiver and identifier module, not shown, may be a module within the DSA 120 adapted to receive documents and determine whether such documents are PDF documents or image documents, including whether the PDF documents are image-only documents. In another example, the conversion module 122 and the PDF processor module 124 may be embodied within a single module, e.g., as a document conversion and processor module, embodying both the features of the conversion module 122 and the PDF processor module 124. The various modules of an exemplary DSA 120 may also be embodied in hardware, as a set of program instructions, e.g., software, or as a combination of both, e.g., firmware.

The printer model database (PMDB) may contain one or more printer capability information, which may include supported image formats, PDF encryption support, PDF image-bypass support, and supported embedded PDF image format. In some embodiments, the PMDB associates a printer model with a set of capability information. Such PMDB may be embodied as a database within a data store. The PMDB 162 may reside in a server 160 operably coupled to the network 140. In some embodiments, the PMDB 112 may also be local to the computing device 110. In other embodiments, not shown, the PMDB may be resident in the printing device 180, 150 and may be accessible via a communication protocol, such as, simple network management protocol (SNMP). One of ordinary skill in the art will appreciate that the PMDB may be stored in various devices and/or applications within the system. Furthermore, the manner of storing and/or providing information about the capabilities of a device may be implemented in other ways, for example, by accessing the Internet and accordingly obtaining latest device capability information. The capability query module 126 may interface with one or more PMDBs to determine the set of capabilities associated with a printer. In some embodiments, the capability query module 126 directly interfaces with the printing device so as to determine that printer's capability information. The printing device, for example, may directly respond to a query transmitted by the capability query module 126.

In some embodiments, the imaging device, e.g., printing device 150, 180, may function as an output device, i.e., render an output, for example, as shown in FIG. 1, where the client, computing device 110 or another imaging/rendering device (not shown), submits a document for printing by the printing device 150, 180. In some embodiments, the document submitted/transmitted by the client 110, includes a set of control instructions or information, such as job specific settings and imaging instructions, e.g., printer job language (PJL) or Simple Object Access Protocol/Extensible Markup Language (SOAP/XML), compatible with the printing device, so as to enable the printing device to generate an output in accordance with the print document to be printed and the optional set of control information. In some embodiments, an output device 150, 180 may produce outputs, based on requests such as requests for printing, copying, outbound faxing, filing, publishing, including image transfers, conversions, video and/or audio presentation. Examples of printing devices may include printers, copiers, facsimile machines, and other imaging devices.

One of ordinary skill in the art will also appreciate that other modules may be included in the exemplary computing device 110 of the present invention. Such additional modules, for example, may include an operating system, a central processing unit, a network communication module, a network interface card, and other modules typically adapted to support the functions and capabilities of the computing device 110. These additional modules may be hardware, a set of program instructions, e.g., software, and or both hardware and software, i.e., firmware. Moreover, although the various embodiments of the invention are exemplified herein within the MICROSOFT (MS) WINDOWS™ family of operating systems, the embodiments of the present invention may also apply to other operating systems, such as, but not limited to, APPLE MACINTOSH™ operating system (OS), Linux OS, System V Unix OS, BSD Unix OS, OSF Unix OS, SUN™ Microsystems Solaris OS, HP™ IUX and UX OSs, and IBM™ Mainframe MVS OS.

Furthermore, in some embodiments, the print document—document to be printed, by the printing device 150 originates not from a general-purpose computing device, but from another client or host device, such as a scanner, facsimile device, a print server, digital X-ray machines, magnetic resonance imaging devices, and a file retrieval server. This other client or host device thus may also include the DSA module 120 as shown.

FIG. 2 is a high-level block diagram representation of an exemplary system 200 with an exemplary DSA 240, 120 of the present invention. The DSA 240, 120 of the present invention is adapted to receive documents of various file formats. Such documents may be embodied as files or portions thereof. In particular, the DSA 240 is adapted to perform the adaptive processes, described herein, to PDF documents 210 and image documents 230. PDF is an exemplary page description language (PDL) document. PDL is a class of document formatting languages adapted to communicate the specifications of a page, e.g., margins, font style, size, and color, to an imaging/rendering device such as a printer. PDL may also be viewed as a device-independent high-level language for instructing a printer, for example, in the manner of properly printing a document, particularly by page, sent from a client or host. Examples of PDL languages include ADOBE® POSTSCRIPT™ (PS), ADOBE® PDF and HEWLETT-PACKARD® Printer Command Language (PCL), including PCL 6 Enhanced formerly known as PCL XL.

PDF documents 210, in addition to being PDL documents, are typically packaged or structured to be compatible, conform with, or support the PDF specification provided by ADOBE®. An exemplary PDF document, for example, may include a header, a body, a cross-reference table, and a trailer. In general, PDF documents 210 may generally be subdivided into three PDF types: image-only PDF documents, searchable image PDF documents, and formatted text and graphics PDF documents. Searchable image PDF documents and formatted text and graphics PDF documents are herein collectively referred to as "other PDF documents." A PDF document 210 may be an encrypted PDF document with a set of security information 220 or an unencrypted PDF 226. Depending on the PDF version supported, these three general PDF types may also be encrypted, i.e., an encrypted image-only PDF document 224A, an encrypted searchable image PDF document 222A, and an encrypted formatted text and graphics PDF document 222A. A PDF document may be encrypted, for example, so as to provide access to only authorized users of such document. A PDF document may also be unencrypted 226, e.g., an unencrypted image-only PDF document 224B, an unencrypted searchable image PDF document 222B, and an unencrypted formatted text and graphics PDF document 222B.

An image-only PDF document 224A, 224B, whether encrypted or not, typically contains a photographic image or picture representing each page or other forms of scanned image data—e.g., encoded bitmaps, such as a scan of a text document without OCR preprocessing, and typically no textual characters or vector graphics. Although text may appear on a page, the text is actually a surface picture or an image without underlying characters. Image-only PDF documents 224A, 224B are typically created by scanning hard-copy documents into a certain image format and then packaging or encoding such scanned documents to a structure compatible or conforming with the PDF file structure or specification. Described in another way, the scanning system takes a picture of or scans each page and then packages the scanned pages into an image-only PDF document. The image-only PDF document thus typically contains an embedded PDF image of a certain file format. One of ordinary skill in the art will appreciate that there may be more than one page and/or embedded PDF image in an image-only PDF document.

In general, the PDF specification, e.g., version 1.6, supports several compression and/or encoding methods. Such methods include, for example, the Lempel-Ziv-Welch (LZW) method that has been adopted as one of the standard compression methods in the TIFF standard, the Group 3 or Group 4 International Coordinating Committee for Telephony and Telegraphy (CCITT) facsimile encoding method, the Joint Bi-Level Image Experts Group (JBIG) version 2 encoding scheme (JBIG2), the discrete cosine transform (DCT) encoding scheme encoded in the JPEG baseline format, and the JPEG2000 compression method. Other encoding schemes are also supported but not exemplified herein. An embedded PDF image in an image-only PDF document, for example, may be encoded based on such encoding schemes.

The other general PDF type 222A, 222B is the searchable-image PDF documents, which in addition to typically containing an image or picture for each page, also typically includes a text layer. This text layer includes textual characters, which may be produced from an optical character recognition (OCR) process, which analyzes each image for what appears to be textual characters. The text layer in some embodiments enables a user to search the PDF document for search text or strings. This text layer also enables PDF documents to be indexed with keywords in a collection of electronic documents, for example. Formatted text and graphics PDF documents 222A, 222B, on the other hand, typically minimize the use of images, e.g., photographic images, or pictures in favor of textual characters and vector graphics. Typically no image layer rests on top of a text layer. Instead, textual characters and vector graphics are drawn wherever they can represent the content of a page. Photographic images may be used when there are pictures that may not be generated from building blocks of textual characters and vector graphics. This type of PDF document is typically the result of conversion from another electronic file format, such as MS WORD. Searchable-image PDF and formatted text and graphics PDF documents are represented as other PDF files 222A, 222B in the exemplary FIG. 2.

Image documents 230 typically contain pictures/images and conform to certain image or graphic file formats. Such image/picture reproduces the likeness of some subject. Images may be two-dimensional, e.g., a photograph, or three-dimensional, e.g., a statue. Images may be captured and produced by optical devices, such as digital cameras and scanners. An image may also be a two-dimensional figure or illustration, such as a map, a graph, a pie chart, a spreadsheet, and a plot. In some embodiments, these images are manually drawn, painted, or carved, for example, via computer graphics applications. Although PDF documents 210 may also contain images similar to image documents, image documents 230 herein are typically those documents encoded, compressed, stored, and/or formatted following specifications other than PDF and PDL. Image documents, for example, are documents conforming to or supporting the following—but not limited to—file formats: Tagged Image File Format (TIFF), Joint Photographic Experts Group (JPEG), including JPEG2000, JPEG File Interchange Format (JFIF), Portable Network Graphics (PNG), Graphics Interchange Format (GIF), Exchangeable Image File Format (Exif), and Bitmaps, e.g., MS WINDOWS bitmaps. Other image file formats, not listed herein, may be processed by the embodiments of the present invention.

The dashed line 264 in general represents an exemplary demarcation of where processing may occur or modules may reside. For example, shapes 210-250 shown above the dashed line 264 are typically related to the host or client, while the shapes 270 below the dashed line 264 are typically related to the output device 270, e.g., a printer.

The exemplary data flow diagram 200 exemplified herein relates to documents to be printed by the printing device 270. These documents 210, 220, 222A, 224A, 226, 222B, 224B, 230 received by the DSA 240 may be remote or local to the DSA and may also include those documents processed by remote or local applications. These documents 210-230 are typically sent to the DSA, for example, due to a user's request to print that document. For example, a PDF document may be sent to the DSA when a user's selects the print option within an application that supports printing of PDF files, or the user may send the PDF files directly to the DSA. These documents may have been submitted by applications, e.g., ADOBE® READER, background processes, and batch jobs, to the DSA for printing, for example. The exemplary documents 210, 230 are typically not processed by printer driver(s), i.e., they are typically directly submitted by the DSA as print documents to printers 270 or other output devices without undergoing printer driver processing. In general, a printer driver is a set of program instructions—e.g., software application—that converts a document, e.g., an MS WORD or PDF document, to be printed to a form specific to the printer. The DSA 240 is also typically adapted to process the documents 210, 230 in their native formats or original formats. Once received by the DSA 240, the DSA performs the adaptive process, described herein, on the received documents 210, 230, so as to take advantage of the capability of the printing device 270, e.g., based on native support for certain image formats.

The DSA module 240 may also receive additional information 250, such as control instructions or information, which may include device settings—e.g., duplex, staple, and resolution, imaging and/or rendering instructions, and other printer instructions. This set of control information 250 may be incorporated as part of the document submitted to the printing device 270. The output devices 270 adapted to receive print documents is typically adapted to directly render or output the submitted documents, using its natively or locally available supported format or mode support. A mode/format is natively supported if such support is locally available to the device, or is performed at the device side, or is performed without printer-driver processing.

A PDL-only printer is typically adapted to support only PDL-formatted documents, i.e., formatted or coded so as to support a page description language (PDL), such as PCL, PCL XL, PS, and PDF. An example of a PDL-only printer is SHARP® AR-507 copier/printer. To support driverless PDL printing, a PDL-only printer has to have the appropriate PDL format support, for example, PCL, PS, and PDF. To support PS, PCL, and PDF documents, for example, a PDL-only printer has to have a PS format module adapted to support the PS format, a PCL format module adapted to support the PCL format, and a PDF format module adapted to support the PDF format, respectively. To exemplify, if the PCL format is not supported by the printer, printer driver processing may have to be performed, typically at the host, on PCL documents, i.e., documents coded in PCL, prior to transmission to such printer.

To enable PDL-only printers to print non-PDL documents, for example, all other non-PDL documents, including application documents, image documents, and text documents, are typically converted to the PDL format, before the document may be printed on the PDL printer. Such conversion is typically performed at the host and with a printer driver. Application documents are documents typically created by application programs, e.g., MS WORD, MS POWERPOINT, and MS EXCEL. Text documents are typically plaintext data or files, such as ASCII files. For illustrative purposes, in the MICROSOFT® family of operating systems, to print an MS WORD document in a PDL-only printer, the MS WORD document is loaded into a format-specific application, e.g., in this case MS WORD. The application, i.e., MS WORD, then converts the document from its native format, i.e., MS WORD format, into a device-independent format, e.g., a graphics device interface (GDI) format. GDI, in general, incorporates device-independent printing or drawings instructions. A device-specific printer for that PDL-only printer then converts the data from the device-independent format, e.g., GDI format, into a printer-specific PDL format supported by the PDL-only printer, so as to enable the PDL-only printer to render the MS WORD document. This MS WORD conversion to a PDL document supported by the PDL-only printer included printer driver processing.

Figure 3:
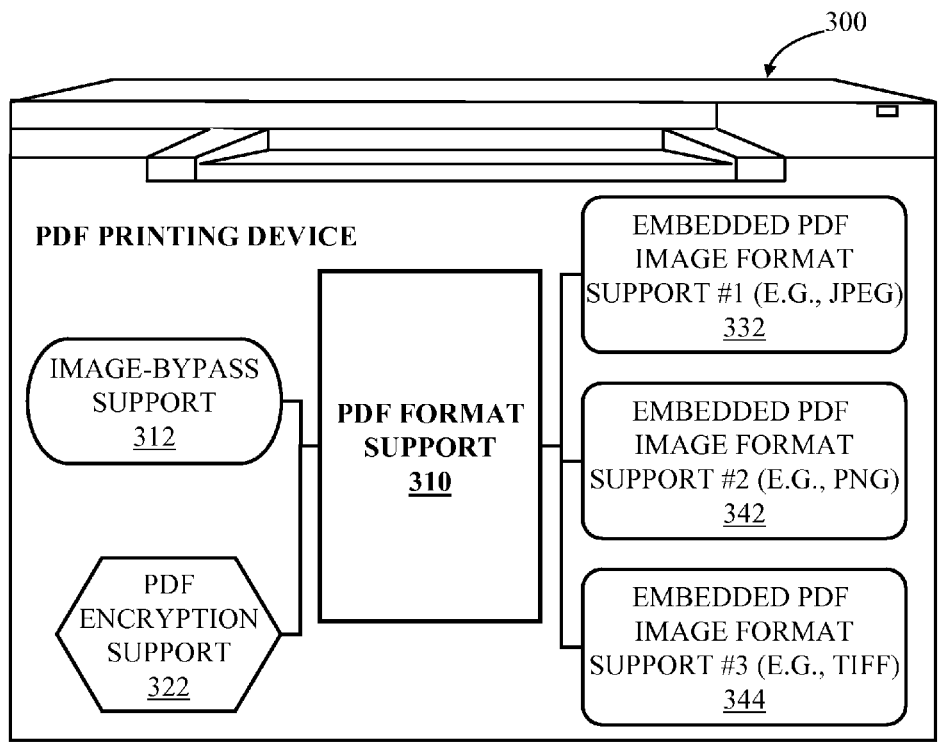
FIG. 3 is a high-level block diagram of an exemplary image printer, according to an embodiment of the invention.

FIG. 3 is a high-level block diagram of an exemplary PDL-only, particularly PDF-only, printing device 300, with which the exemplary DSA 240 may interface, according to some embodiments of the invention. This exemplary PDF printer 300 is adapted to support PDF documents, without printer driver processing. This typically means that the DSA may submit a PDF document to the printing device 300 without having printer driver processing be performed typically at the host on the PDF document. Typically, the PDF format support module 310 is adapted to directly interpret or process the PDF document, e.g., rasterize the PDF document. An exemplary PDF format support module 310 may also be adapted to support the PDF image-bypass mode 312 and the PDF encryption mode 322. The PDF format support module 310 may also be adapted to directly or natively support embedded PDF image formats of image-only PDF documents, e.g., embedded PDF JPEG format/mode 332, embedded PDF PNG format/mode 342, and embedded PDF TIFF format/mode 344, for example. An image-only PDF document with an embedded PDF JPEG image may be sent directly to this exemplary PDF printer by the DSA without printer driver processing. On the other hand, an image-only PDF document with an embedded PDF image format not supported by the exemplary PDF-only printer 300, e.g., embedded PDF image with GIF format, may have to undergo printer driver processing. One of ordinary skill in the art will appreciate that this exemplary PDF printer may be modified, for example, by adding PCL format support and PS format support and yet still be in the scope of the invention. Furthermore, depending on the capabilities designed to be implemented on the printing device by the manufacturers, some of the particular PDF format or mode support 312, 322, 332, 342, 344 may be eliminated or varied, for example, and yet still be in the scope of the present invention.

Figure 4:
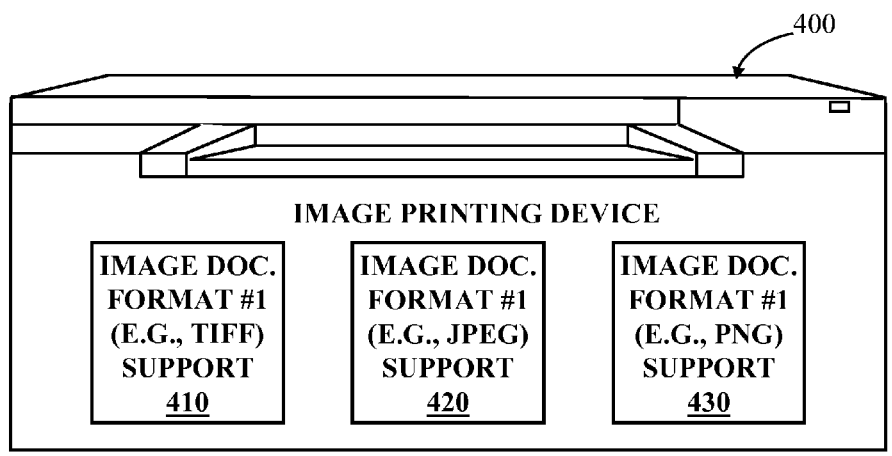
FIG. 4 is a high-level block diagram of an exemplary page description language (PDL) printer, particularly adapted to support the portable document format (PDF), according to an embodiment of the invention.

FIG. 4 is a high-level block diagram of an exemplary image-only printing device 400 adapted to directly or natively process some of the exemplary image documents transmitted by the exemplary DSA 240, according to some embodiments of the invention. This exemplary image printing device 400 is adapted to natively support three image formats/modes of image documents, particularly TIFF 410, JPEG 420, and 430 PNG. These three exemplary format support modules 410, 420, 430 enable the device 400 to receive TIFF image documents—i.e., image documents in TIFF format, JPEG image documents—i.e., image documents in JPEG format, and PNG image documents—i.e., image documents in PNG format, without having the host perform printer driver processing. An image document with an image format or mode that is not supported by the exemplary image printing device, e.g., WINDOWS bitmap, may have to undergo printer driver processing. One of ordinary skill in the art will appreciate that the image format supported in this exemplary image-only printing device may be modified based on implementation.

In some embodiments, not shown, a printing device may be adapted to support both PDF format and one or more image formats, e.g., TIFF and JPEG,—a combination printing device (PDF+image). This combination printing device may have image format support for image documents and image format support for embedded PDF images. The exemplary DSA of the present invention may also interface with a combination PDF and image format (PDF+image) printing device. In some embodiments, when there is a combination PDF+image printing device, the embedded PDF image format module adapted to support an embedded PDF image with TIFF format 344, for example, may interface with or use the image format module 410 adapted to support a TIFF image document format. SHARP® AR-M277 printer is an exemplary embodiment of a combination PDL and an image (PDL+image) printing device.

Figure 5:
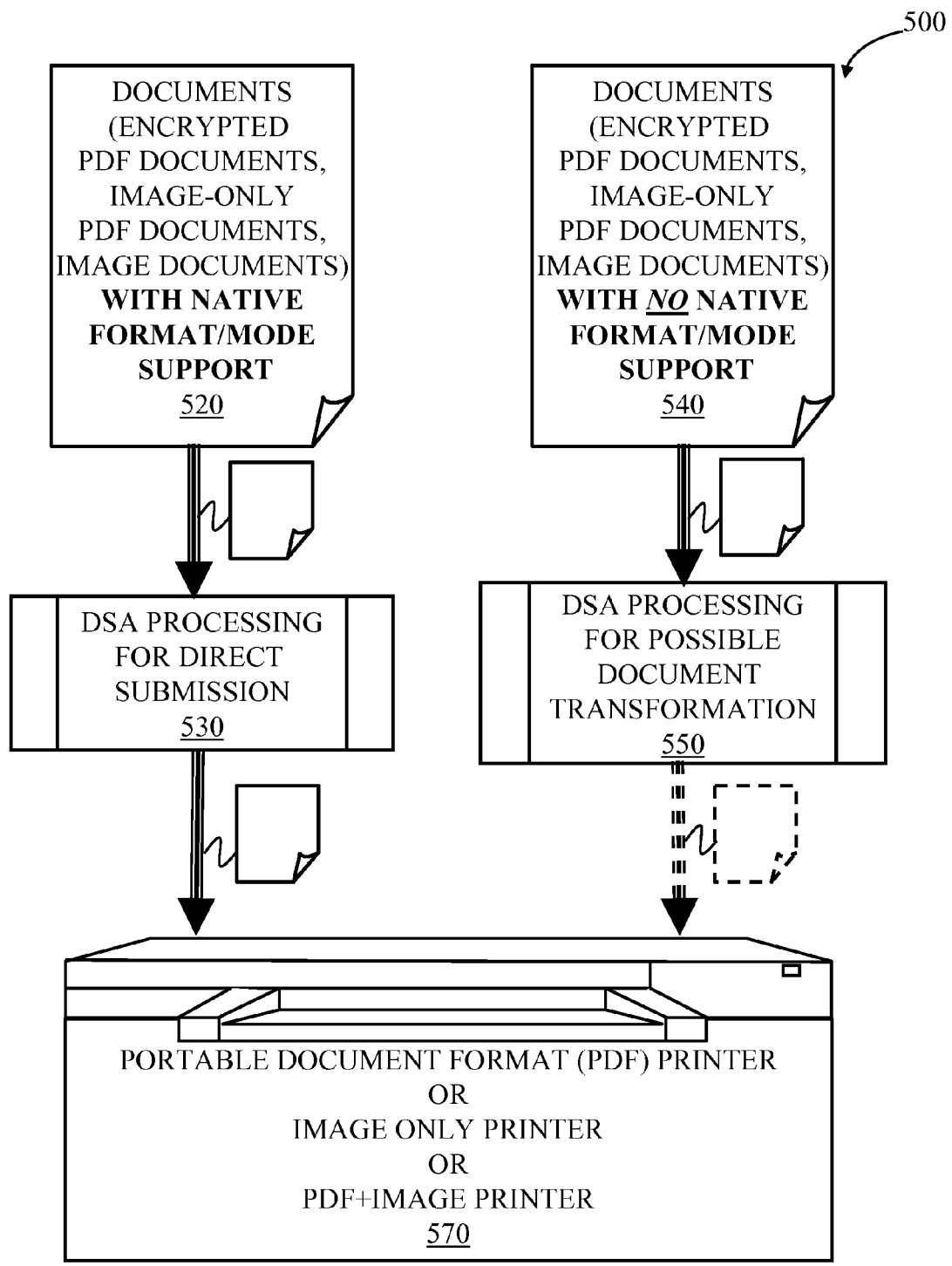
FIG. 5 is a high-level exemplary data flow diagram of documents, according to an embodiment of the invention.

FIG. 5 is a high-level exemplary data flow diagram 500 showing an exemplary manner by which the DSA 240 process documents, according to some embodiments of the invention. In general, a document with native or available format/mode support 520, i.e., the output device is adapted to support the format of the document 520, is directly transmitted, without further processing, by the DSA 530 to the output printing device 570. On the other hand, a document that has no native or available format/mode support 540, i.e., the output device 570 is not adapted to support the format/mode of the document 540, may undergo some document transformation process 550. This transformation process may include changing and/or converting one image format to another as well as one document file format to another, e.g., JPEG to TIFF and/or image document to an image-only PDF document. The DSA may then transmit this transformed document 550 to the output printing device 570.

Figure 6:
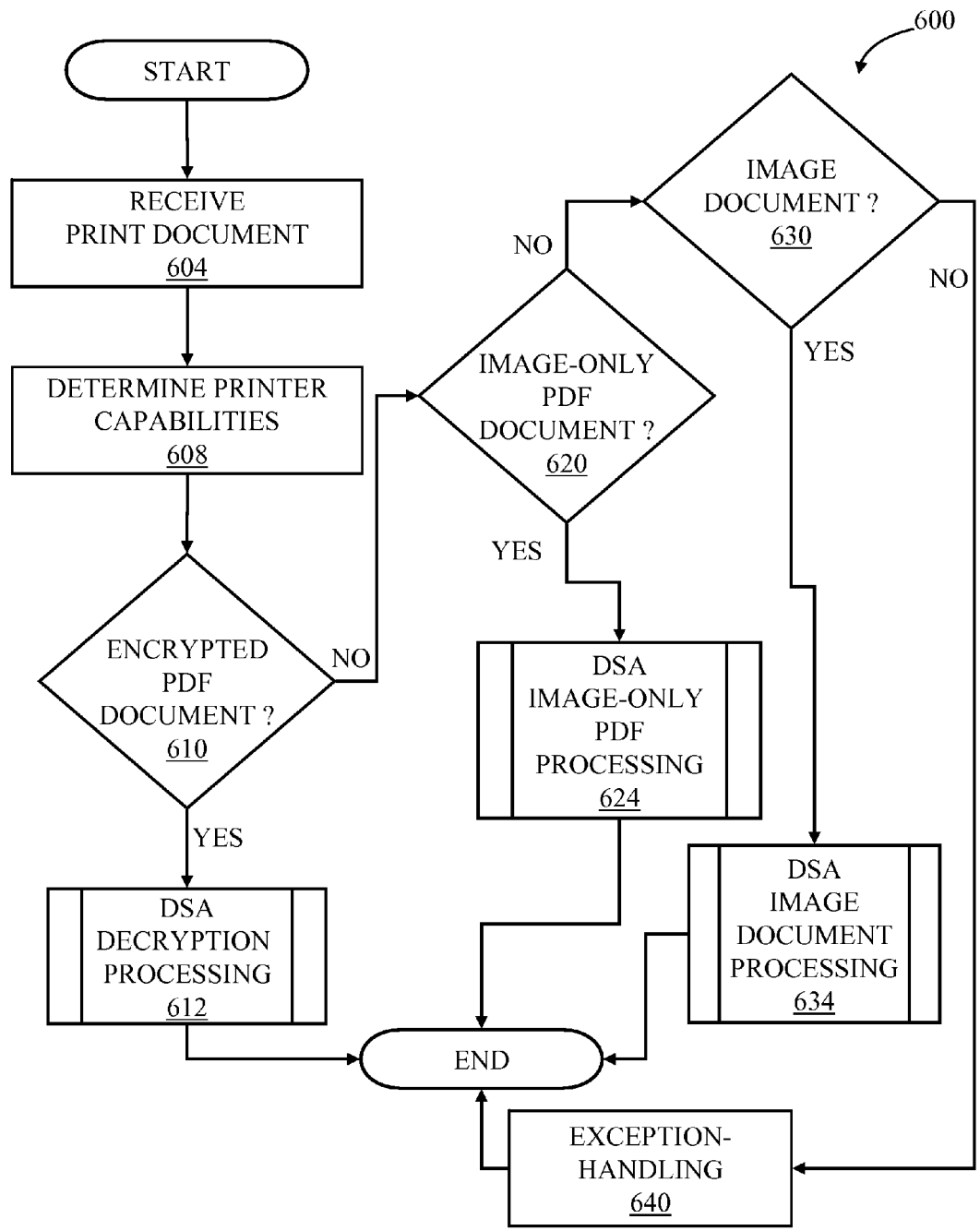
FIG. 6 is a high-level flowchart of an exemplary process of a direct submit application module, according to an embodiment of the invention.

FIG. 6 is a high-level flowchart of an exemplary process 600 performed by an exemplary DSA, according to an embodiment of the invention. In the first operation, the DSA typically receives a document for printing by an output device, e.g., a printing device (operation 604). The DSA 120, in particular, the capability query module 126 determines the capabilities of the printing device directed to print this received document (operation 608). Such device capabilities may include information related to the formats/modes supported by the device—e.g., image formats/modes, embedded PDF image formats/modes, image-bypass mode, and PDF encryption mode. The determination of a printer's capability, for example, by the capability query module 126, may occur as part of the printing process, be performed periodically, be performed at system boot-up or startup, be performed on demand, or based on other conditions. In other embodiments, updates, e.g., periodic updates, may be sent to the capability query module 126 informing such module of printers currently connected to the computing device 110 and their respective capabilities. In other embodiments, the capability query module 126 may interface with one or more PMDB 112, 162 that may be local or remote to the DSA module 120, e.g., resident in the printing device 150, 180. The PMDB 112, 162, for example, may include printer model and/or printer type. In some embodiments, the capability query module 126, via SNMP, may query a management information base (MIB) for printer capability information. In other embodiments, the capabilities of one or more printers may be preconfigured in the DSA, for example, defined by a system administrator in a PMDB 112 accessible by the DSA 120. Other embodiments in the manner and/or timing of obtaining device capabilities may also be implemented and still be in the scope of the present invention.

Based on the set of capability information determined/obtained, a check is then made by the DSA to determine if the document received is an encrypted PDF document (decision 610). One of ordinary skill in the art will appreciate that there are many ways of identifying the file format of a document. In some embodiments, formats may be identified with unique signatures. Table I below shows exemplary format types and their associated typically unique signatures thereby enabling identification of a particular document or image format. These unique signatures, for example, may be found in the header area of some documents. In some embodiments, other areas of the document may also be searched, for example, in the encryption dictionary of a PDF document to determine other file format information and/or other additional information about the document. In other embodiments, if an image, e.g., TIFF image, is embedded/encapsulated in an image-only PDF file, the unique signature of that image format may be included in the image object, for example, as defined or provided by the PDF specification.

TABLE I

Exemplary Signatures Associated with Certain Document or Format Types

| Format Type | Signature |
|---|---|
| PDF | % PDF |
| PS | %!PS |
| PCL | <ESC>E |
| PCL XL | ) HP-PCL XL; |
| TIFF | II*<NUL> or MM<NUL>* |
| JPEG | 0xFF 0xD8 0xFF 0xEE |
| JPEG 2000 | 0xFF 0x4F |
| PNG | 0x89PNG |
| GIF | GIF87a OR GIF89a |
| MS Windows Bitmap | BM |

If the received document is an encrypted PDF document, the DSA may perform a DSA decryption process (operation 612). Otherwise, a determination is then made whether the received document is an image-only PDF document (decision 620). An image-only PDF document, for example, may be identified by reading the appropriate section of the PDF file structure, for example, reading the cross-reference table and determining whether the table only references images, in accordance to an image-only PDF document structure. Other processes of identifying an image-only PDF document is known to those of ordinary skill in the art.

If the received document is an image-only PDF document, the DSA performs an image-only PDF process (operation 624). Otherwise, a determination is made whether the received document is an image document (decision 630). If the received document is an image document, the DSA performs an image document process (operation 634). Otherwise, exception-handling procedure(s) (operation 640), e.g., requesting or performing printer driving processing on the received document prior to transmission to the directed printing device, are performed.

Figure 7A:
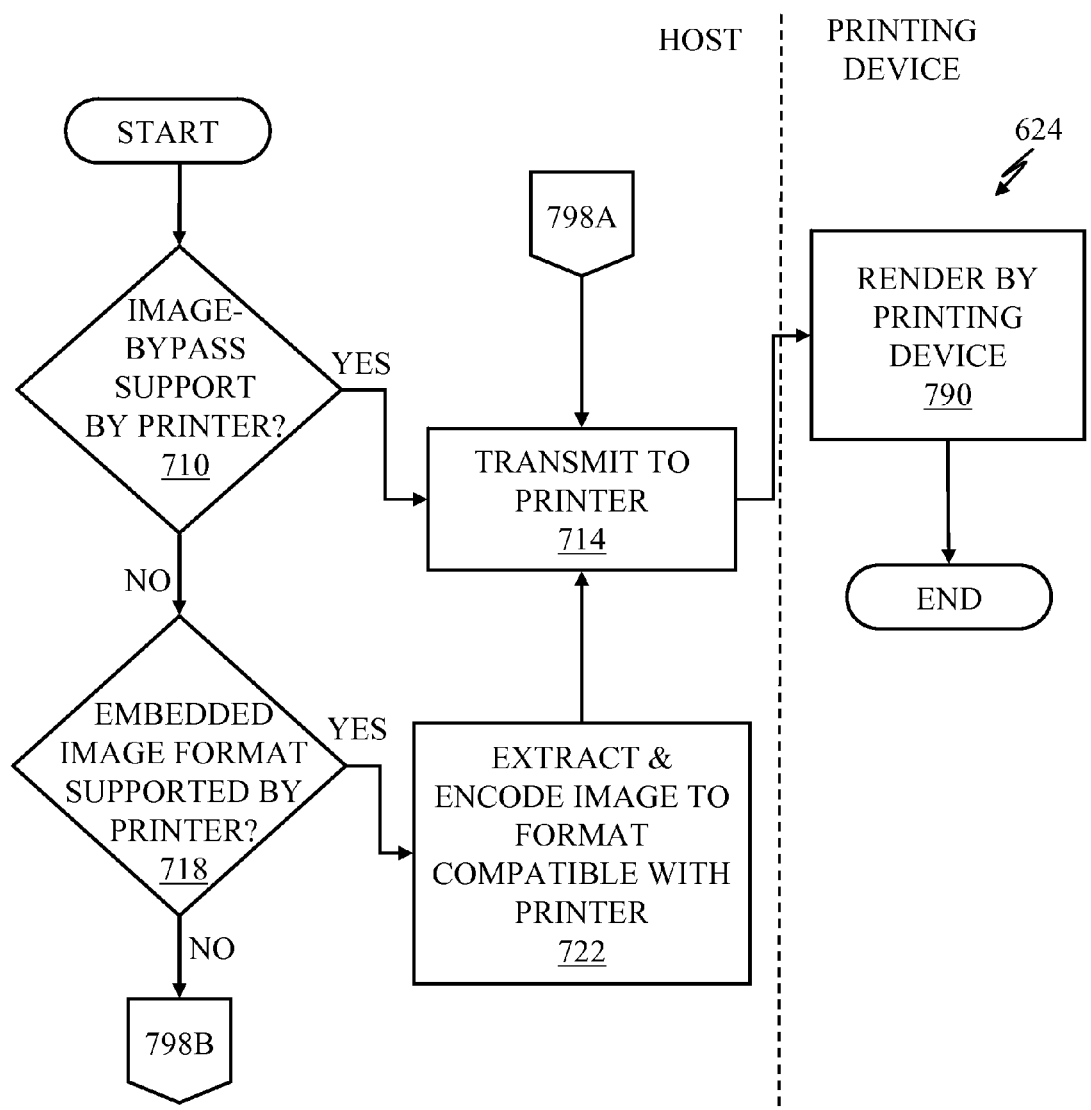
FIGS. 7A and 7B illustrate a high-level flowchart showing an exemplary process by which an image-only PDF document may be processed, according to an embodiment of the invention.
Figure 7B:
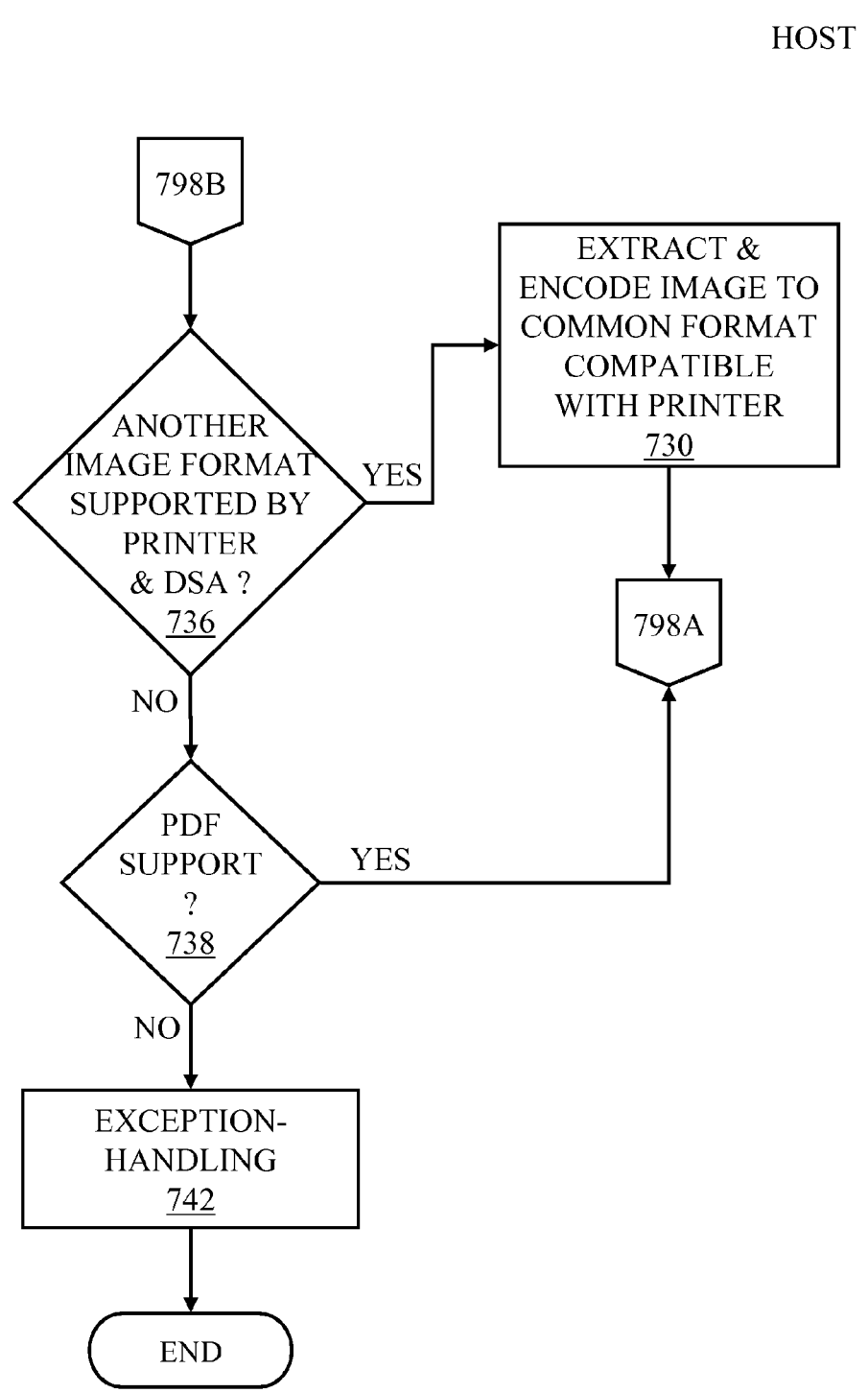
Figure 8:
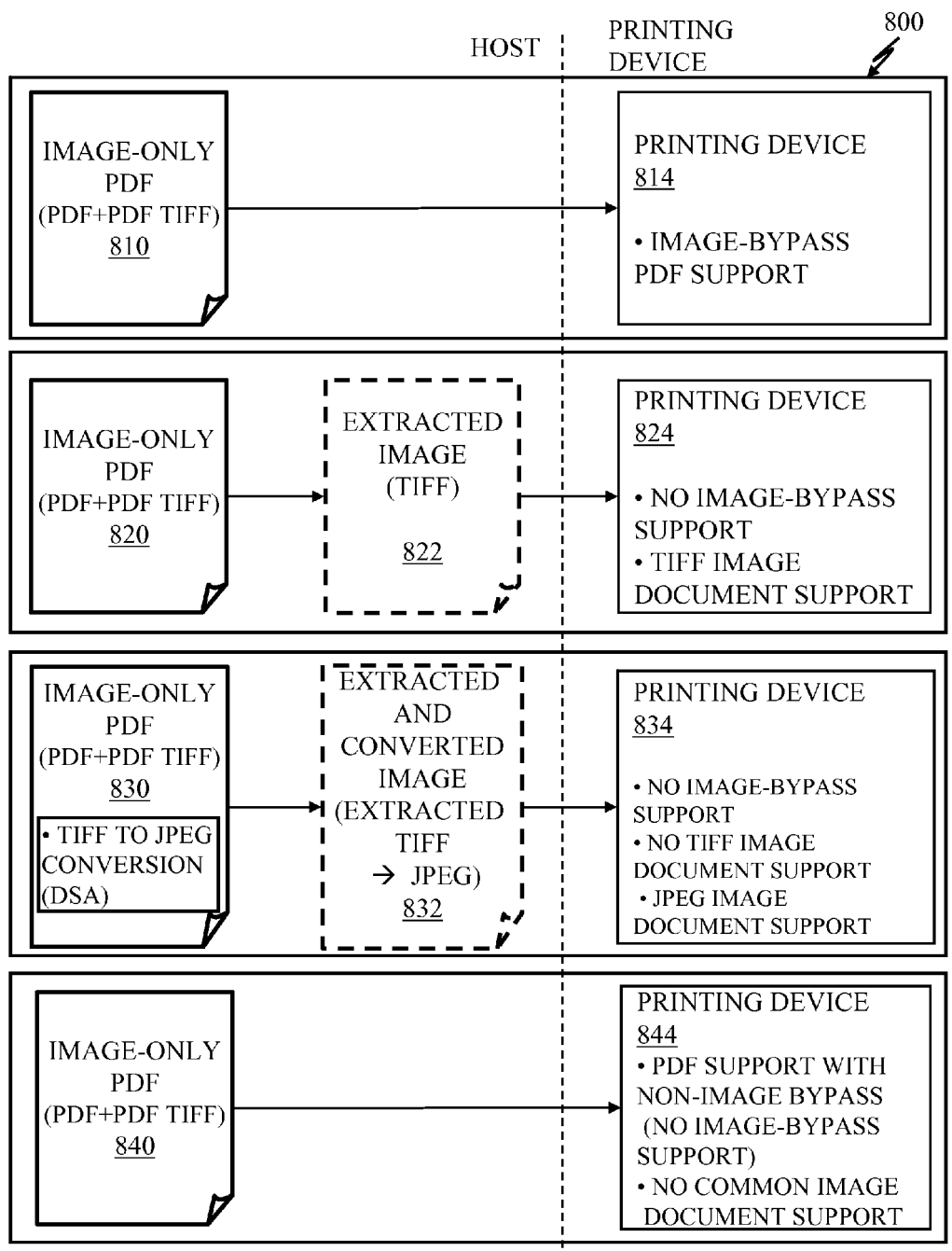
FIG. 8 is a high-level block diagram representing exemplary image-only PDF documents and exemplary printers with exemplary format capabilities adapted to process such exemplary image-only PDF documents, according to some embodiments of the invention.

FIGS. 7A and 7B together illustrate a flowchart of an exemplary DSA image-only PDF process 624 of driverless printing of typically unencrypted image-only PDF documents 224B, according to an embodiment of the invention. FIG. 8 is a high-level block diagram 800 illustrating exemplary unencrypted image-only PDF documents and transformed image-only PDF documents submitted to printing devices, according to embodiments of the invention. FIGS. 7A, 7B, and 8 are discussed in conjunction with each other.

In some exemplary embodiments, some printing devices are adapted to perform an efficient, typically device-based, image-only PDF processing. This efficient image-only PDF processing feature may be identified and taken advantage of by the DSA 120. As discussed above, an image-only PDF document typically consists of an image, associated with an embedded PDF image data format, encapsulated within a PDF wrapper. One of ordinary skill in the art will appreciate that there may be multiples pages in each PDF document, and each page may be associated with or encapsulates an image. Typically all the images are encapsulated within a PDF wrapper and are packaged as one PDF file.

An exemplary device-based efficient manner of processing image-only PDF documents is described below. This process is herein referred to as an image-bypass PDF process. An image-bypass PDF process may generally include the following operations:

a) The image data, e.g., TIFF image data, encapsulated in the PDF document is extracted;
 b) The extracted image data is processed by a decoder, which generates a bitmap image; and
 c) Processing, by an image-handling unit, the bitmap image into printer engine-ready data so as to print the document.

In some embodiments, this image-bypass PDF mode of processing may be natively supported by a printer. Typically, an image-only PDF document may be rendered and/or rasterized and outputted faster by a printer controller or printing device, supporting this image-bypass PDF process, as compared to an image-only PDF document processed via a non-image-bypass PDF process. This image-bypass PDF mode thus enables an image embedded within a PDF document to be simply decoded into a bitmap image, and subsequently into output engine format, without undergoing various translations.

On the other hand, a conventional non-image-bypass mode of image-only PDF processing may be construed as a less inefficient process of processing image-only PDF documents, considering the process involves several translations from one format to another. For example, a conventional process, i.e., a non-image-bypass PDF process, not as efficient as the above image-bypass process, may include performing the following operations:
  a) Translating, by a PDF interpreter, the PDF document into PS code/instructions, i.e., into a PS document;
  b) Translating, by the PS interpreter, the PS instructions into a common display list (CDL);
  c) Processing, by the CDL interpreter, the CDL into a bitmap image; and
  d) Processing, by an image-handling unit, the bitmap image into printer engine-ready data so as to print the document.

Thus, this non-image-bypass PDF process employs a PDF interpreter, which then translates the PDF document data into an intermediate format. This intermediate format is also then translated into a bitmap image, which is then finally processed into an output engine format. This non-image-bypass process is typically performed at the host or client. In some embodiments, additional overhead may also be incurred by the PDF interpreter, in that it may perform translations operations above bitmap handling and thus may consume more random access memory (RAM)—e.g., memory footprint and a greater number of instruction counts—e.g., central processing unit (CPU) cycles—to perform the same outcome.

Once the printer capabilities have been determined, the DSA 120 may then determine or verify if the printing device is adapted to natively support an efficient image-only PDF mode of processing, such as the image-bypass PDF process exemplified above (operation 710). If the printer natively supports this image-bypass mode of operation (operation 710, "yes" branch), the DSA 120 then directly transmits, typically without further processing, the image-only PDF document to the printer (operation 714). The printing device, which has the image-bypass mode support, then accordingly renders the image-only PDF document according to its natively supported image-bypass capability, for example (operation 790). Referring to FIG. 8, an image-only PDF document, for example, encapsulating an image with an embedded PDF TIFF image format 810, is directly transmitted by the DSA 120 to the printing device 814, if that device 814 natively supports the image-bypass PDF mode of processing or an efficient mode of image-only PDF process. The DSA 120 is thus designed to dynamically adapt to the capabilities of the printer, and is able to determine where processing is to occur based on such printer capabilities, thereby providing in some embodiments, efficient printing processing. This efficient mode of processing thus may be performed at the printing device when such capability is natively supported. Alternatively, an efficient mode of processing, e.g., image-bypass PDF mode, may be performed or emulated on the host side by the DSA 120, if unavailable at the printing device as further discussed below.

On the other hand, if the printing device does not natively support an efficient mode of image-only PDF processing (operation 710, "no" branch), the DSA then determines if the printing device has the capability of directly printing the image data embedded or encapsulated in the PDF document as an image document, i.e., whether the printer is also adapted to support an image format compatible (e.g., TIFF with the same or backward compatible version or the same compression algorithm and the same encodings (e.g., bit depth, color space, etc)) with the image format of the embedded PDF image (operation 718). This operation (operation 718) typically determines whether the printing device is adapted to render an image document with an image format compatible with the image format of the embedded PDF image. Typically, at this point, the DSA, for example, via the PDF processor module 124, is aware of the embedded PDF image format of the embedded image encapsulated in the image-only PDF document. Two common formats are typically compatible with each other if they belong to the same specification group, for example, a TIFF image document and an embedded PDF TIFF image are compatible or common formats, although may be structured differently, while a TIFF image document and an embedded PDF JPEG format are not. One of ordinary skill in the art will appreciate that TIFF formats and JPEG formats are inherently different and are defined by different specifications or standards.

To illustrate, an exemplary image-only PDF document 820 contains an embedded PDF image with an embedded PDF TIFF image format (at operation 718). The embedded PDF image format, e.g., TIFF, and the image document format of an image document, e.g., TIFF, are distinguished or called differently considering that the image data or image, e.g., a picture of a cat, embedded within an image-only PDF document may be structured differently from the image data when packaged as an image in an image document. For example, the embedded PDF TIFF image of the cat may be structured or encoded differently when encapsulated within a PDF document, as when such image of the cat is stored as an image document, with a TIFF file extension and format, for example.

The DSA (at operation 718) checks if the printing device natively supports the direct printing of document images in the TIFF format, e.g., TIFF file types. If the printer 824 natively supports the TIFF image document format (operation 718, "yes" branch), the DSA, e.g., via the PDF processor module, extracts the embedded PDF TIFF image from the image-only PDF document 820, performs any appropriate re-encoding or processing to ensure that the printing device is enabled to process and render the TIFF image 822 format of this transformed image document, e.g., into a document with TIFF file format, and then transmits this extracted and encoded image 822 to the printing device 824. The encoding process may include taking out extraneous PDF structure information or restructuring the image data in conformance with the applicable image format supported, for example. The printing device, with this TIFF document image format support, accordingly renders the received extracted and encoded TIFF image, using its natively supported image format for image documents (operation 790). The manner of extracting embedded or encapsulated PDF images as well as encoding them to the image format of image documents are known to those of ordinary skill in the art. Thus, in some embodiments, if the printing device 824 natively supports the direct printing of the embedded PDF image using its native support of printing such image format for image documents, the DSA module thus may emulate the image-bypass PDF process.

On the other hand, if the printing device does not have a native image format support for the embedded PDF image (operation 718, "no" branch), the DSA then determines if the printing device is adapted to natively support alternate image document formats (operation 736, FIG. 7B). The DSA also determines whether the DSA, e.g., the conversion module 122 interfacing with or without the PDF processor module 124, is adapted to convert the embedded PDF image from its original embedded PDF image format to one of the alternate image document formats natively supported by the printing device. If the DSA determines that there is at least one common image format supported by the conversion module 122 and by the printing device, the DSA or the conversion module 122 interfacing with the PDF processor module 124, extracts the embedded PDF image from the image-only PDF document, converts that extracted image to the alternate image format, performs any appropriate encoding or processing to the converted image so as to be compatible with the image document format support of the printing device, e.g., transforms to a JPEG file type (operation 730). The transformed or converted image document is then transmitted to and rendered by the printing device (operation 714, 790). To illustrate, the embedded PDF TIFF image 830 is extracted, converted, and encoded to a JPEG image document format 832 (at operation 736), if the printing device 834 does not natively support the TIFF image document format, but does support the JPEG image document format, and the DSA is adapted to convert the embedded PDF TIFF image to a JPEG image document format. If the DSA and the printer 834 have more than one image format commonly supported, conditions may be defined defining the format priority. This condition, for example, may be defined such that JPEG format is the first image format conversion choice, followed by the GIF format, and so on and so forth. In other embodiments, the quality of the image that may result from the conversion may be considered.

If the DSA and the printing device 834 have no common supported image format support, i.e., the DSA is not adapted to convert the embedded PDF image format into at least one image document format supported by the printer, the DSA then determines if the printing device has a PDF format support (operation 738). If the printer has PDF support (operation 738, "yes" branch), the DSA module typically directly submits, without further processing, the image-only PDF document 840 to the printer 844 for rendering. This PDF format supported by the printing device 844 is thus not an efficient image-only PDF mode of processing, e.g., it is not an image-bypass PDF process. The image-only PDF document is transmitted to the printer 844 without typically the benefit of the image-bypass PDF process performed on the host side and the device/printer side. For example, if the DSA has determined that the printer has PDF support (at operation 738, "yes" branch), the exemplary image-only PDF file 840 is directly transmitted to the exemplary printing device 844.

If the printer has no PDF support (operation 738, "no" branch), the DSA may perform some exception handling procedures 742. Such exception-handling procedures may include, but are not limited to:
1) Rejecting the print job and informing the user that the image-only PDF file is not supported by the printer;
2) Converting the image-only PDF file into yet another format, e.g., PS or PCL format, supported by the device, with the conversion performed, for example, by the DSA module, by a format-specific application, or by a device-specific printer driver; or
3) Having the DSA suggest an alternate printing device adapted to appropriately render the image-only PDF file.

One of ordinary skill in the art will appreciate that a PDF document may include more than one page. Typically, the document is rendered page by page. For example, each embedded PDF TIFF image 830, for example, may be converted 832 to image document JPEG format, if the image document TIFF format is not supported but image document JPEG format is supported by the printing device 834.

The embodiments of the present invention may also have the DSA, in addition to transmitting the image-only PDF document 810, 840 or the transformed image document 822, 832, transmit control information 250, e.g., printer control settings—if supported by the DSA or by the printing device so as to indicate to the printing device the manner in which the document is to be printed or rendered. If no control information is transmitted, the printing device may render or output the document using the device's default settings. In other embodiments, the control information and/or the document transmitted to the printing device may be further processed, such as be compressed or encrypted, for example. In cluster printing embodiments, e.g., copy/document splitting or job broadcasting, different copies or partitions—e.g., pages—of the image-only PDF, may be separately processed according to the capabilities of each output device for each respective copy or partition, for example.

Figure 9A:
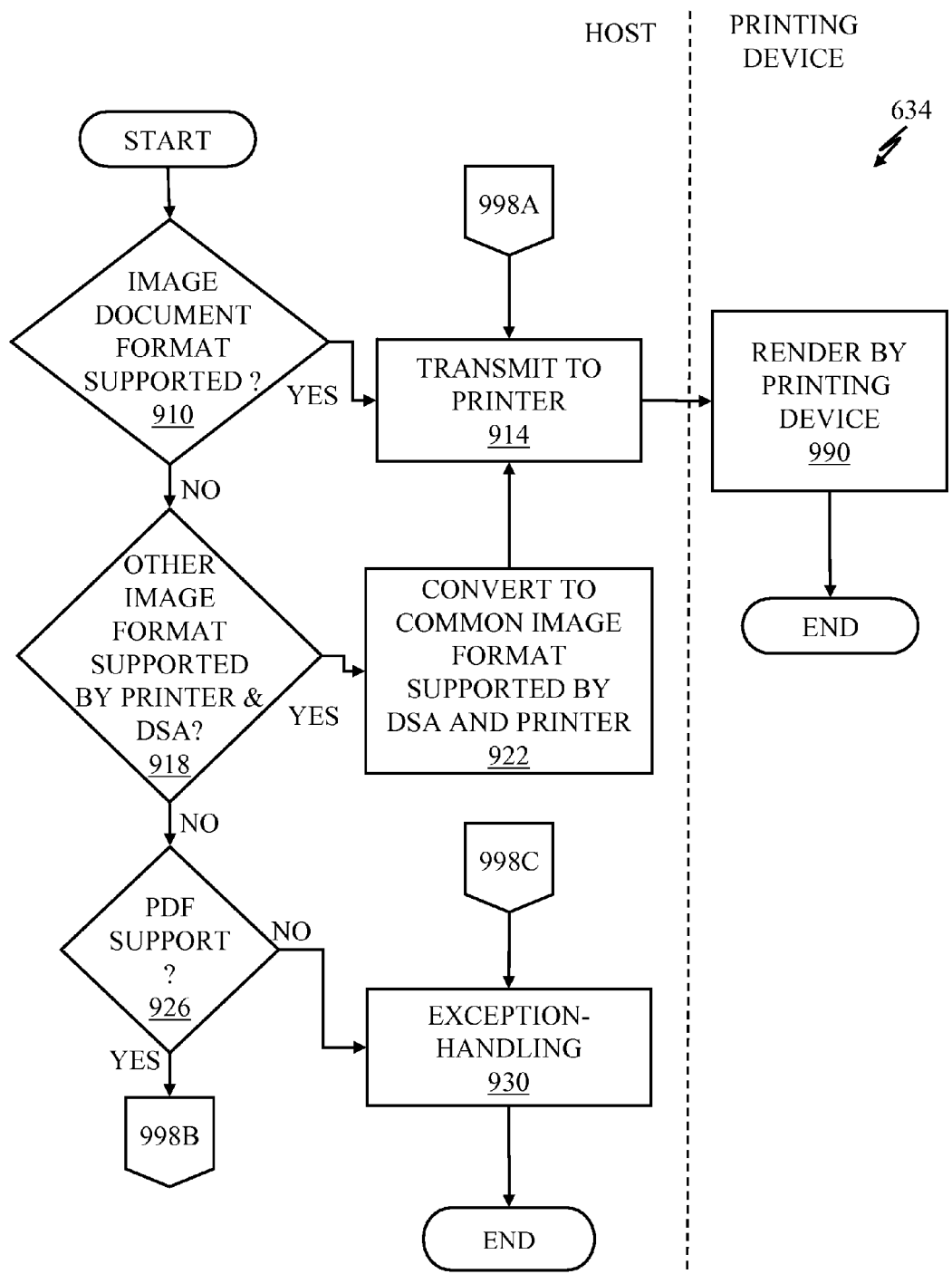
FIGS. 9A and 9B illustrate a high-level flowchart showing an exemplary process by which an image document may be processed, according to an embodiment of the invention.
Figure 9B:
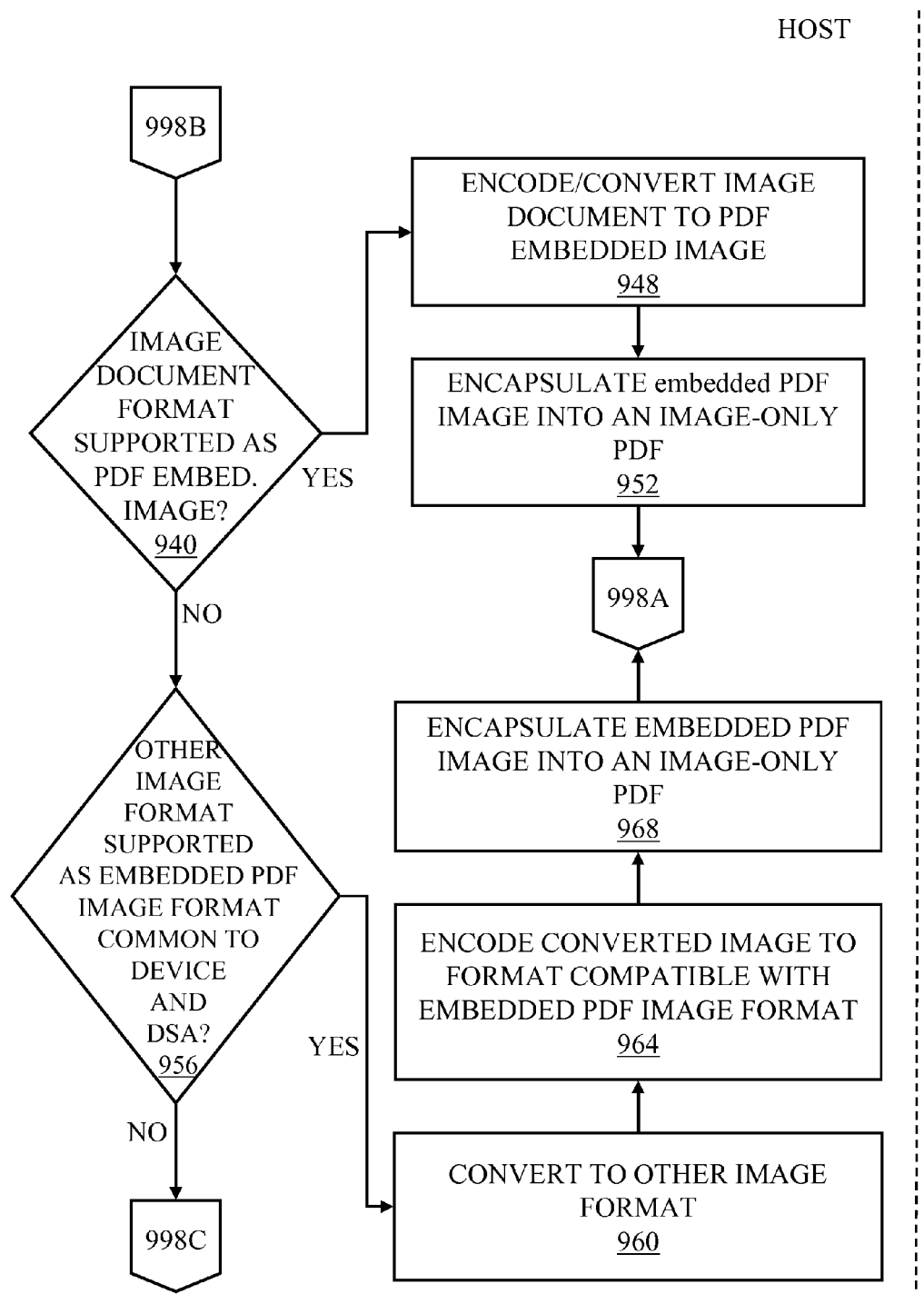
Figure 10:
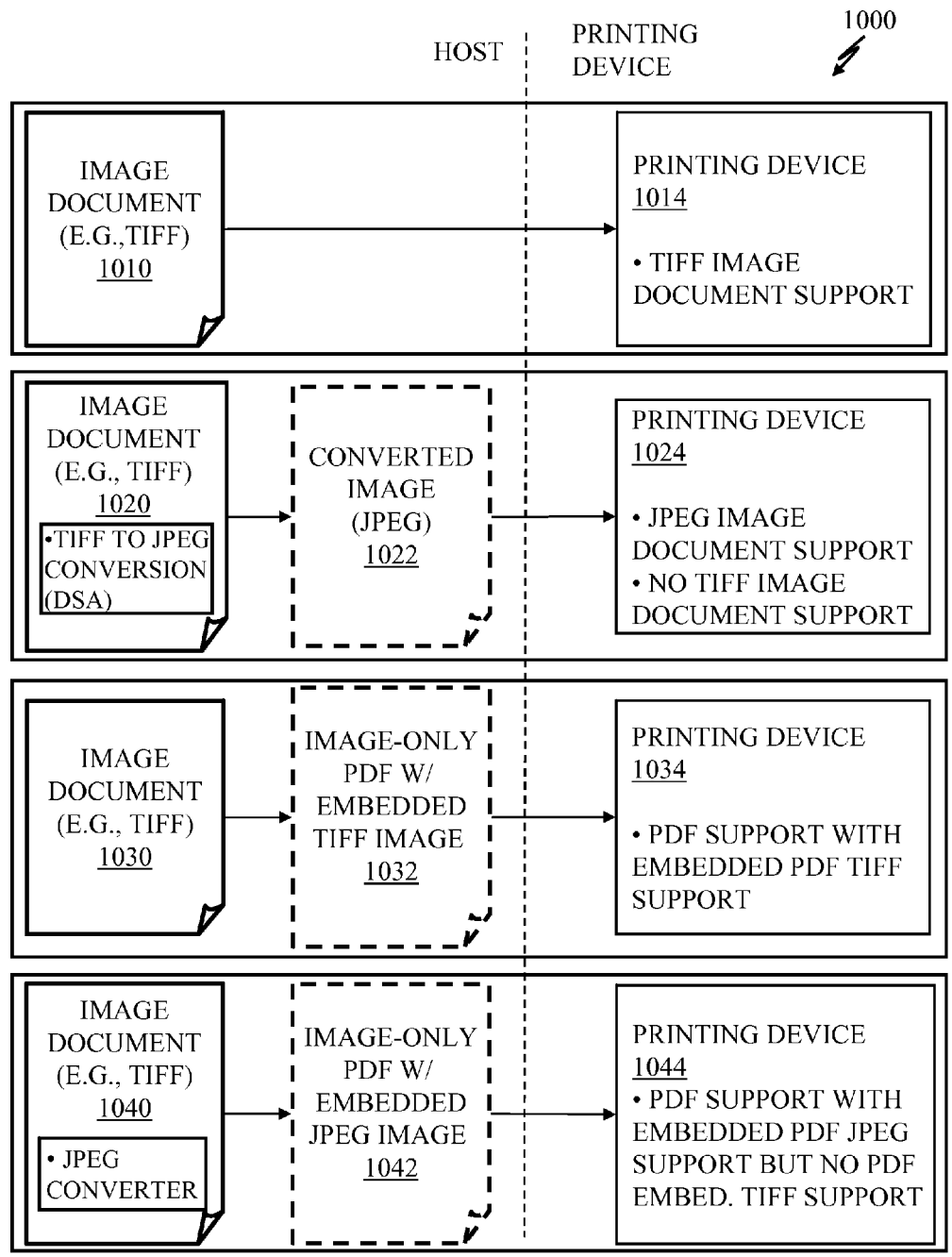
FIG. 10 is a high-level block diagram representing exemplary image documents and exemplary printers with exemplary format capabilities adapted to process such exemplary image documents, according to some embodiments of the invention.

FIGS. 9A and 9B together illustrate a flowchart of an exemplary DSA image document process 634 of driverless printing of image documents 230, according to an embodiment of the invention. FIG. 10 is a high-level block diagram 1000 illustrating exemplary image documents and transformed documents submitted to printing devices, according to embodiments of the invention. FIGS. 9A, 9B, and 10 are discussed in conjunction with each other. In this embodiment of the invention, the DSA provides the user with an expanded set of image formats that may be rendered or outputted across devices. In general, an expanded set of image formats, document image formats and embedded PDF image formats, is provided by conversion of a non-supported image format by the host into a format supported by the rendering device, e.g., a printer.

When the DSA is requested to print an image document, the DSA determines if the printer is adapted to support the image document format of the image document. If the image document format is natively supported by the printing device (operation 910, "yes" branch), the DSA directly transmits the image document to the printing device typically without further processing (operation 914). The device accordingly renders the image document using its native image document format support (operation 990). For example, a TIFF image document 1010 is directly transmitted by the DSA 120 to the device 1014, if the device is adapted to natively support the TIFF image document format 1014.

Otherwise, the DSA determines if the device has an image document format support for an alternate or a different image format for which the DSA also has a conversion method (operation 918). This operation is similar to that discussed above in FIG. 7B. If a common image format is supported by both the conversion module or the DSA and the device (operation 918, "yes" branch), the DSA 102, e.g., via the conversion module 122, emulates the image format handling by converting the image document to the common image format supported by the DSA and the printing device (operation 922). For example, if the DSA (at operation 918) has determined that JPEG is an image document format common or supported by both the conversion module/DSA and the device, the conversion module 122 may then convert the TIFF image document 1020 into a JPEG image document 1022 compatible with the JPEG image document format supported by the printer 1024. This transformed image document 1022 is then transmitted to the device 1024 for rendering using its native JPEG image document format support.

If no common image format is identified (operation 918, "no" branch), the DSA then determines if the device has support for the PDF format (operation 926). If the device supports the PDF format, another check is then made to determine whether that PDF support capability is adapted to handle PDF encapsulated or embedded images with the same or compatible format as the image document (operation 940). If the device PDF support is adapted to support that embedded PDF image format (operation 940, "yes" branch), the DSA, e.g., the PDF processor module 124, transforms the document by encoding the image document into an embedded PDF image (operation 948) and encapsulating that embedded PDF image so as to generate an image-only PDF (operation 952). Such encoding process may include updating or adding appropriate structure information, e.g., adding object information in the cross-reference table, for example. For example, a DSA (at operation 940) may then check if the device 1034 has PDF support capability adapted to support the embedded PDF TIFF image format in an image-only PDF document. If the device 1034 does have this capability, the DSA then accordingly transforms the image document 1030 into an image-only PDF 1032 with an embedded PDF image 1032. This image-only document 1032 is thus efficiently rendered by the device 1030 using its natively supported PDF format with embedded PDF image format support. The image-only PDF 1032 thus includes an embedded PDF TIFF image representing the TIFF image document 1030.

On the other hand, if the PDF support of the printer is not adapted to support the image document format of the image document (operation 940, "no" branch), the DSA then determines if the PDF-capable printer, i.e., with PDF support, is adapted to support another image document format that is also supported by the DSA, e.g., by the conversion module 122. If a common alternate format is supported (operation 956, "yes" branch), the DSA, e.g., the PDF processor module and/or the conversion module, may then transform the image document into an image-only PDF document with an embedded PDF image format supported by the printing device. The DSA thus in some embodiments emulates the image format handling process. This transformation process may include converting the image document into another image format supported as an embedded PDF image format (operation 960), encoding the image document into a format compatible with an embedded PDF image format (operation 964), and encapsulating the encoded embedded PDF image into an image-only PDF (operation 968). This image-only PDF document is then transmitted to the printing device for rendering (operations 914, 990). For example, if the image document has a TIFF image file format 1040 (at operation 956), and the DSA, e.g., the conversion module, is adapted to convert an image document from TIFF format to JPEG format, and the PDF-capable printer is adapted to support the PDF embedded JPEG format, the DSA then converts the image document 1040 from TIFF to JPEG format, encodes the data into an embedded PDF JPEG format, and then encapsulates the embedded JPEG in an image-only PDF document 1042. The printer 1044 accordingly renders the image-only PDF using its natively available PDF support.

If the output device, however, is not adapted to support PDF (operation 926, "no" branch), exception-handling procedures 930 may be invoked. Such exception-handling procedures 930 may be those similar to that discussed above.

Similar to FIGS. 7A and 7B, the image document 1010 or the transformed image-only document 1022, 1032, 1042 transmitted to the device may additionally include control information. In some embodiments, the transmitted document 1010, 1022, 1032, 1042, optionally including the control information, may be further compressed or encrypted by the DSA. In exemplary cluster printing environments, different copies, or partitions of (e.g., pages), may be separately processed according to the capabilities of each output device for each respective copy or partition.

Figure 11:
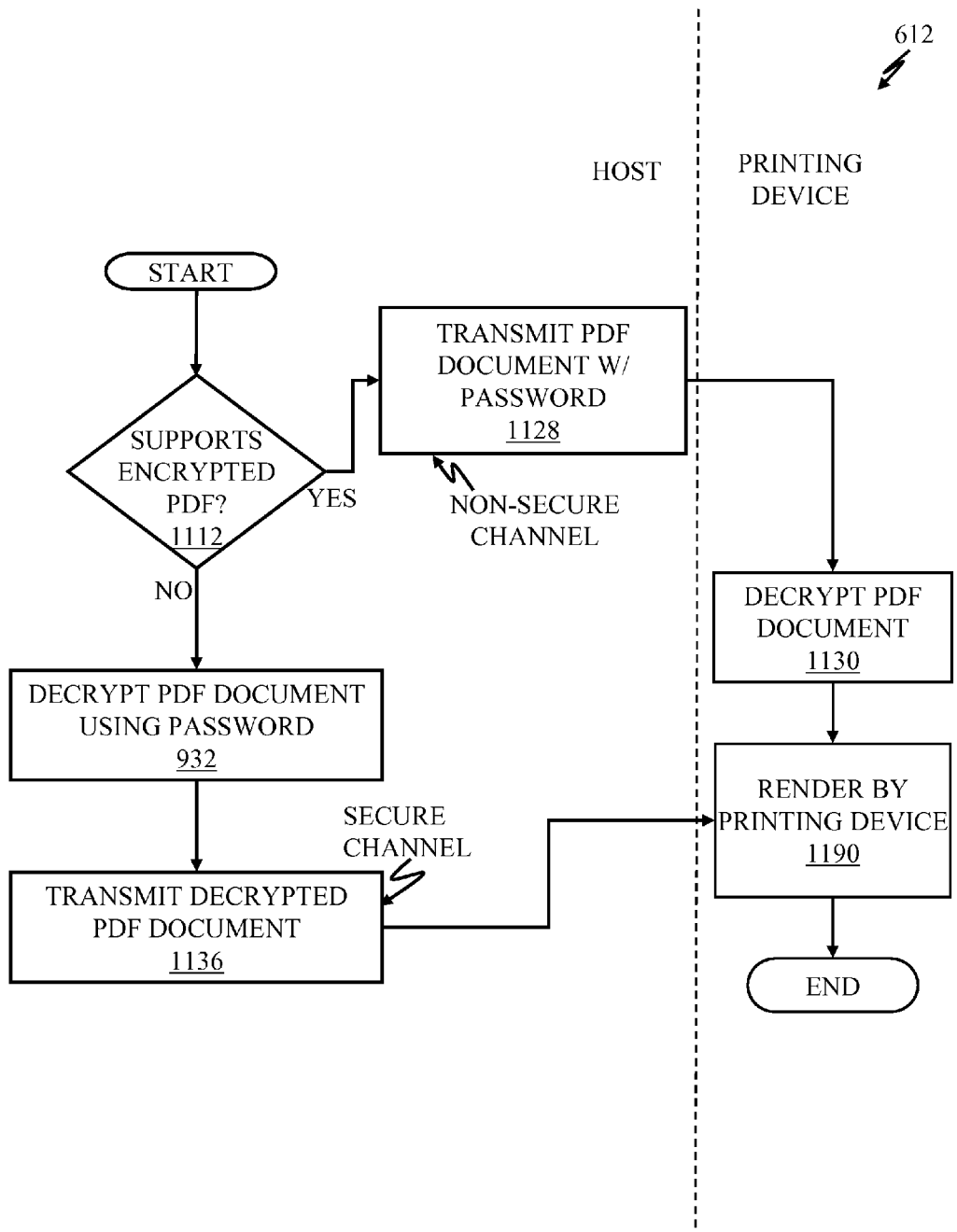
FIG. 11 is a high-level flowchart showing an exemplary process by which an exemplary encrypted PDF document may be processed, according to an embodiment of the invention.

FIG. 11 is a high-level exemplary DSA decryption process 612 to process encrypted PDF files. In some embodiments, the DSA 120 is adapted to process encrypted PDF documents, protected by a set of security information, for example, a password. This password may be converted into a decryption key, e.g., via an MD5 message-digest algorithm, for decrypting the contents of the encrypted PDF document. In some embodiments, PDF documents may be encrypted using the RC4 algorithm or the advanced encryption standard (AES) security algorithm. RC4 is a proprietary algorithm of RSA Security, Inc. Exemplary encryption and decryption algorithms are described in the PDF specification. In general, RC4 and AES are symmetric algorithms, i.e., the same algorithm is applied for both encryption and decryption. In some embodiments, PDF's security handler provides access permissions and up to two-passwords to be specified for a PDF document. Such encryption information or set of security information is typically stored in the encryption dictionary of the PDF document.

In general, when the DSA is requested to print an encrypted PDF document 220, e.g., image only PDF-documents 224A or other PDF documents 222A such as searchable image PDF documents and formatted text and graphics PDF documents, the DSA determines if the printer is adapted to process encrypted PDF documents (operation 1112). If the printer has encrypted-PDF mode support (operation 1112, "yes" branch), the DSA 120 transmits the encrypted PDF document, including the associated password(s) (operation 1128), to the printer without further processing. In some embodiments, this transmission (operation 1128) is via a non-secure channel. The associated password and/or set of security information, in some embodiments, may be protected by any of the general exemplary process:

a. Converting the associated password into an encryption key according to the method specified in the PDF's encryption dictionary of the encrypted PDF document;

b. Encrypting the password in a manner by which the rendering or output device may decrypt and retrieve/generate the appropriate key, e.g., using a public/private key method;

c. Transmitting, to the rendering or output device, the associated password unencrypted, but via a secure transport method (e.g., SSL), e.g., where the key may be passed with the encrypted PDF document or passed in a separate secured communication channel; or d. Transmitting the PDF document and the associated password unprotected. Once the PDF document and the associated password(s) or set of security information, either protected or unprotected password(s), are received, the device employing its PDF-encryption support accordingly decrypts the document (operation 1130), and accordingly renders the PDF document (operation 11190).

If the DSA, however, determines that the targeted device is not adapted to support encryption (operation 1112, "no" branch), the DSA, e.g., the decryption module 128, emulates the processing of the encrypted PDF document, by decrypting the PDF document using the password, for example, on the host side (operation 932), and then transmitting the decrypted PDF document to the printer (operation 1136). The device in turn renders the decrypted PDF document (operation 1190). The transmission of the decrypted PDF document may be via a secure channel, if available.

This exemplary DSA decryption process 612 in general emulates the decryption in the host side. Another embodiment, however, not only determines if the printing devices support PDF encryption but also determines if the printing device is adapted to support an efficient mode of image-only processing, such as image-bypass process, as exemplified in FIGS. 12A and 12B.

Similar to the image-only PDF documents (FIGS. 7A and 7B), and the image documents (FIGS. 9A and 9B), when the encrypted PDF document (operation 1128) or the decrypted PDF document (operation 1136) is sent to the device, the transmitted information may additionally be accompanied by control information. Otherwise, the PDF document is typically rendered according to the device's default settings. The PDF document and/or accompanying control information may be further post-processed, such as compressed or encrypted. Furthermore, in the case of a cluster printing environment, different copies, or partitions of (e.g., pages), may be separately processed according to the capabilities of each output device for each respective copy or partition.

Figure 12A:
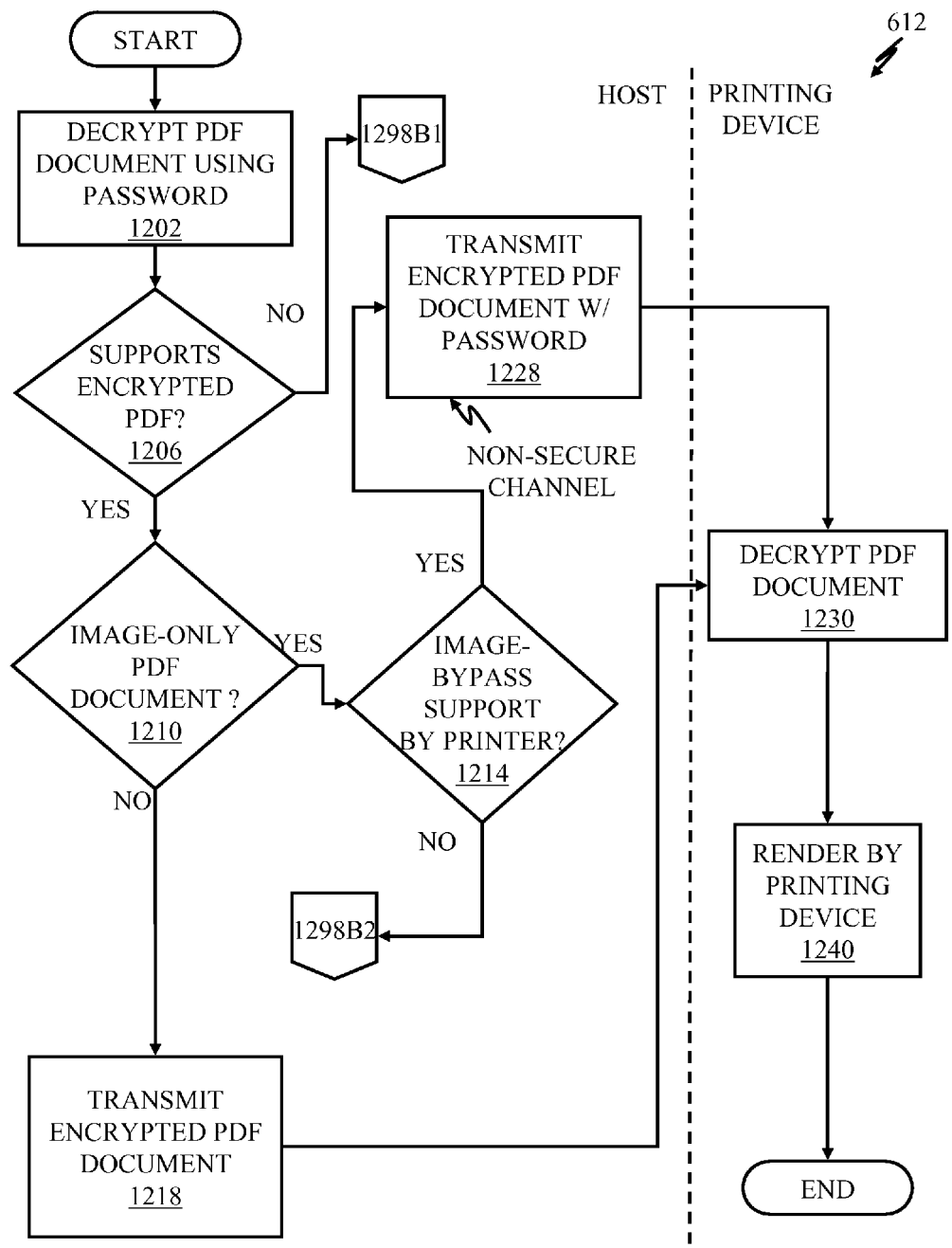
FIGS. 12A and 12B together illustrate a high-level flowchart showing another exemplary process by which an exemplary encrypted PDF document may be processed, according to an embodiment of the invention.
Figure 12B:
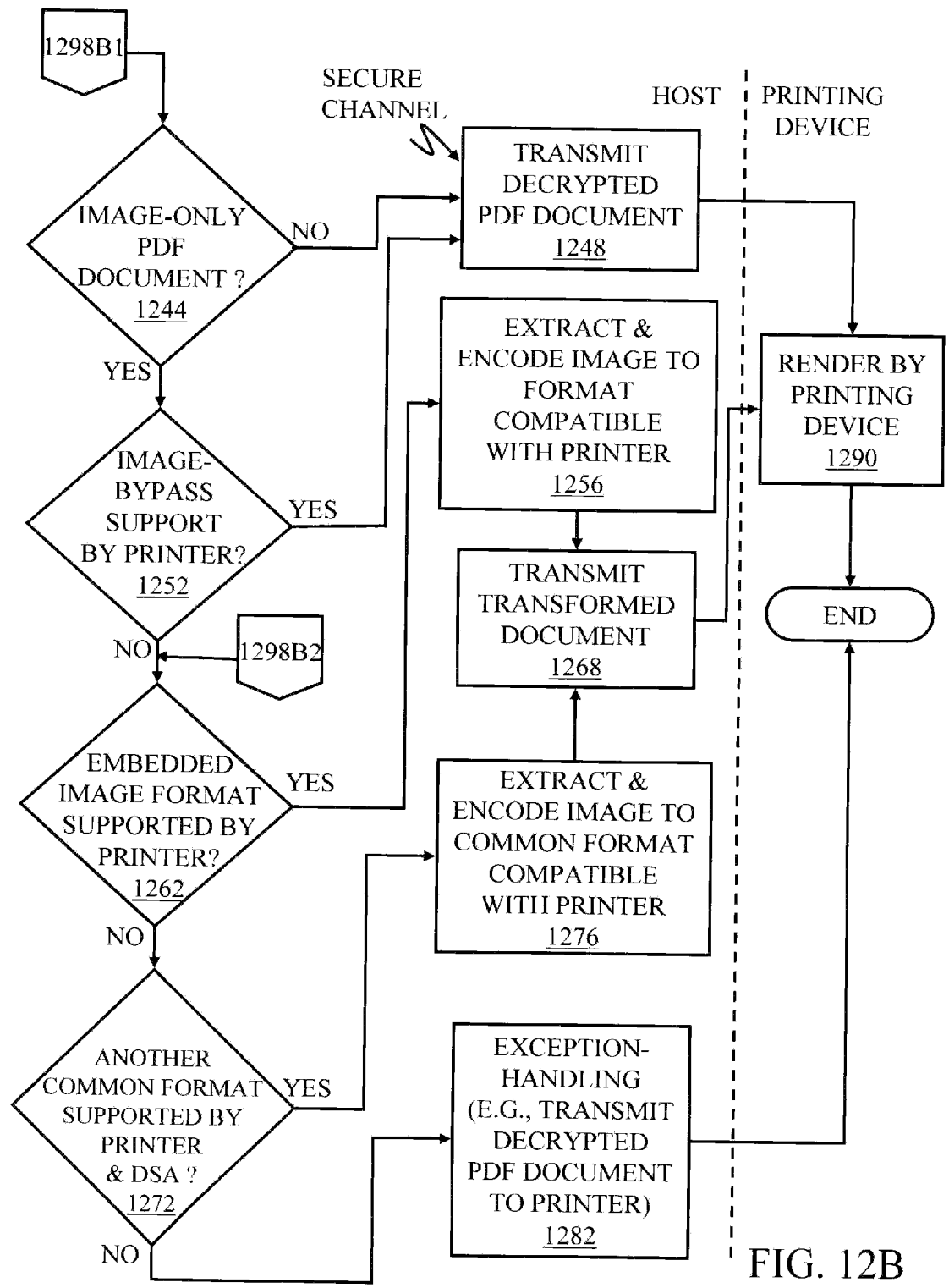
Figure 13:
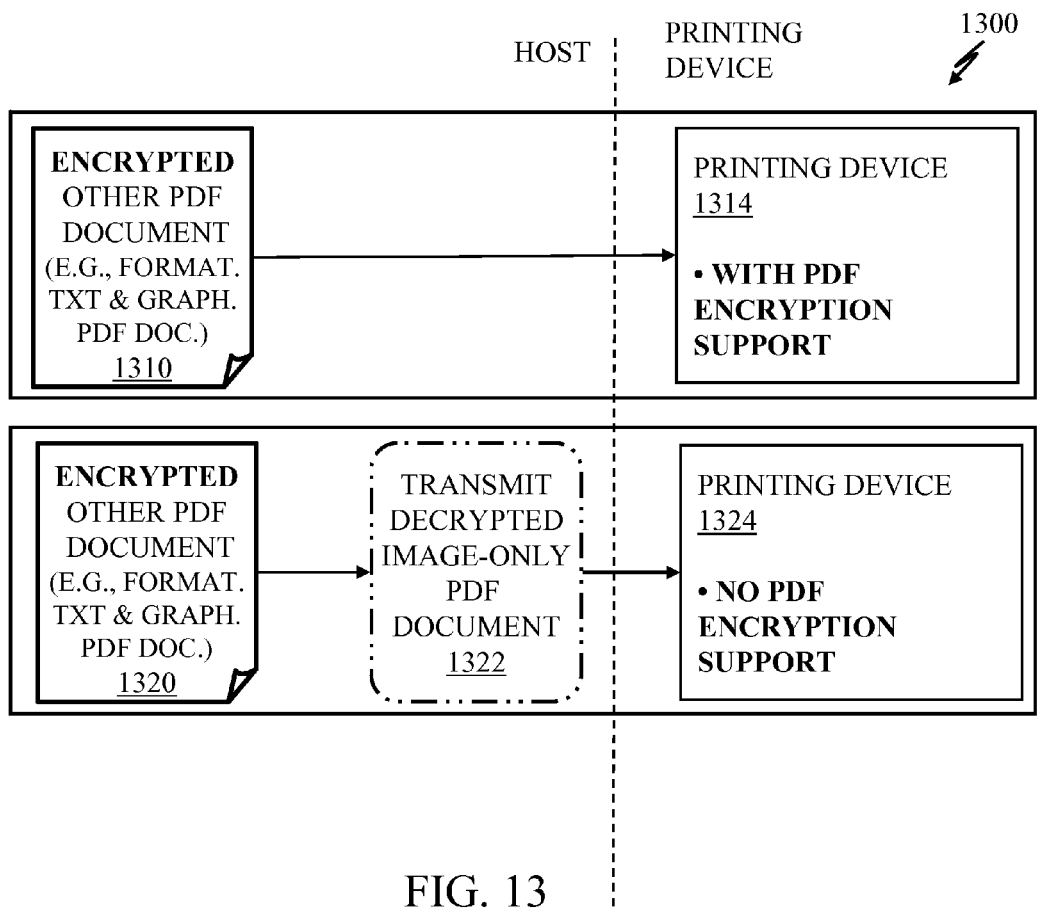
FIG. 13 is a high-level block diagram representing exemplary encrypted PDF non-image documents and exemplary printers with exemplary format capabilities adapted to process such exemplary encrypted non-image PDF documents, according to some embodiments of the invention.
Figure 14A:
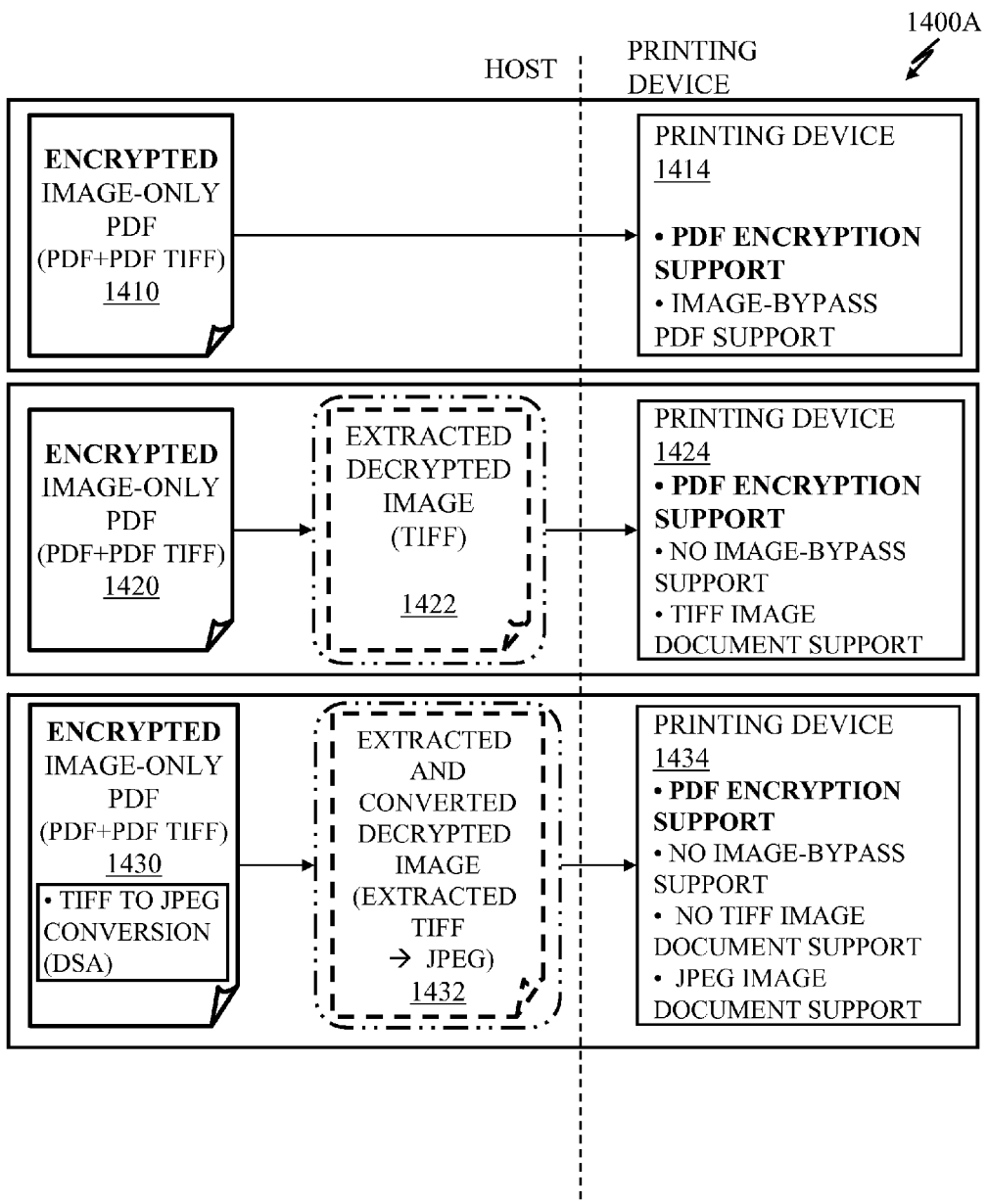
FIGS. 14A and 14B together illustrate a high-level block diagram representing exemplary encrypted image-only PDF documents and exemplary printers with exemplary format capabilities, particularly with PDF encryption support, adapted to process such exemplary encrypted image-only PDF documents, according to some embodiments of the invention.
Figure 14B:
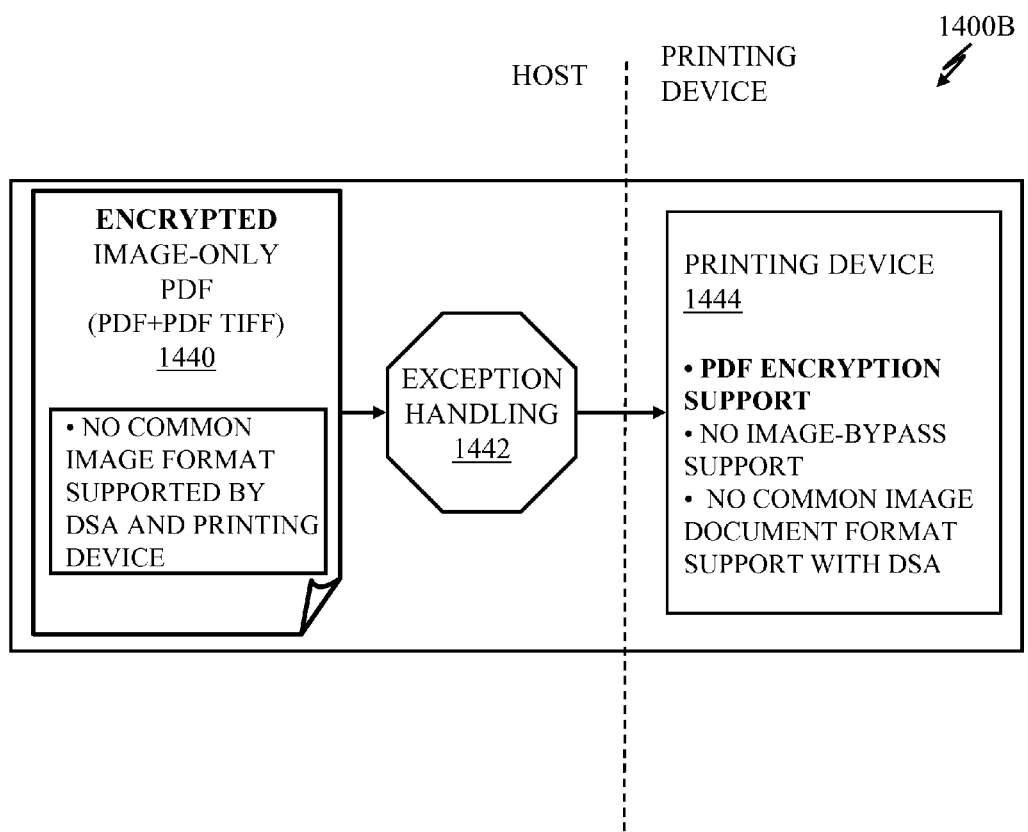
Figure 15A:
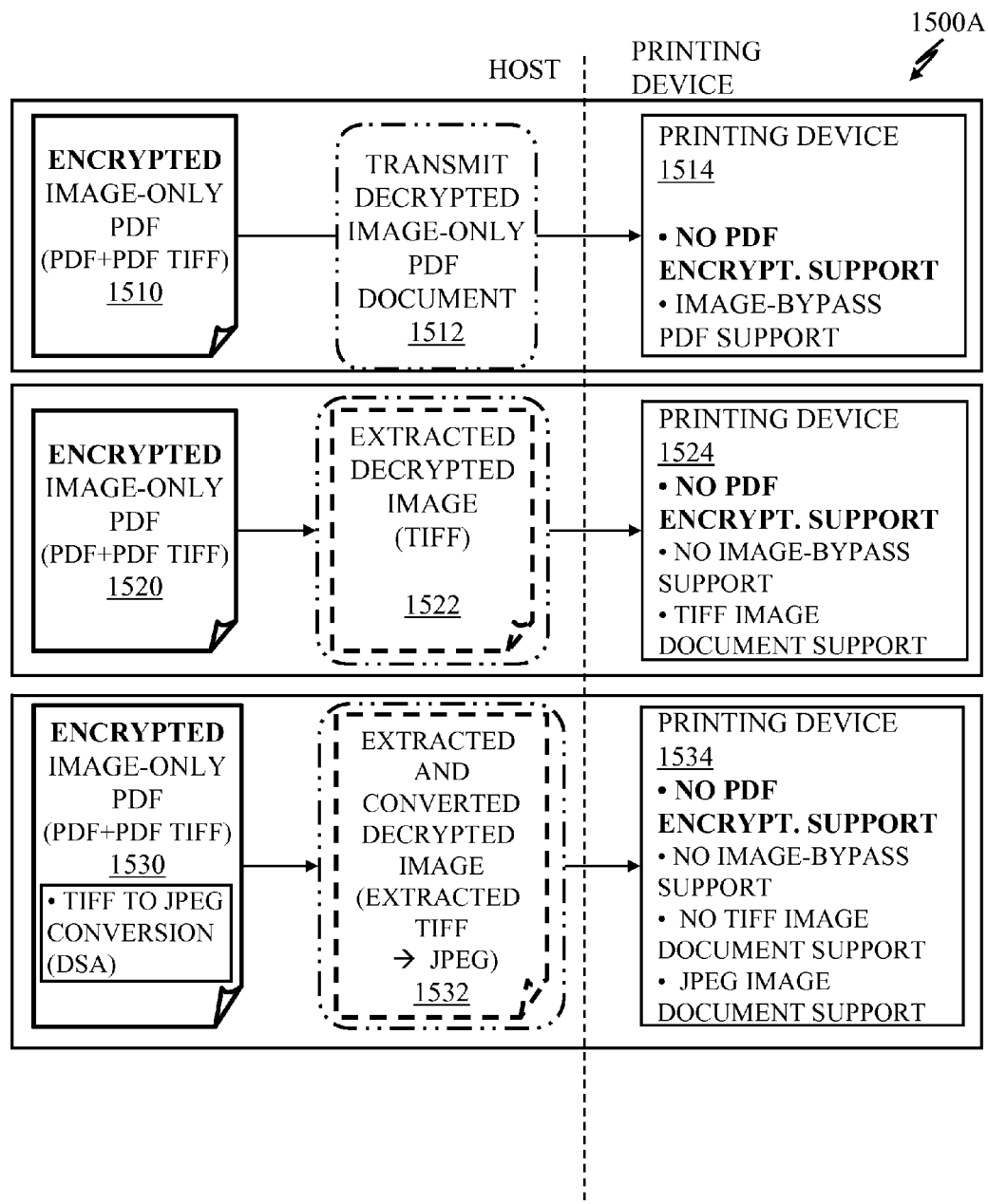
FIGS. 15A and 15B together illustrate a high-level block diagram representing exemplary encrypted image-only PDF documents and exemplary printers with exemplary format capabilities, but with no PDF encryption support, adapted to process such exemplary encrypted image-only PDF documents, according to some embodiments of the invention.
Figure 15B:
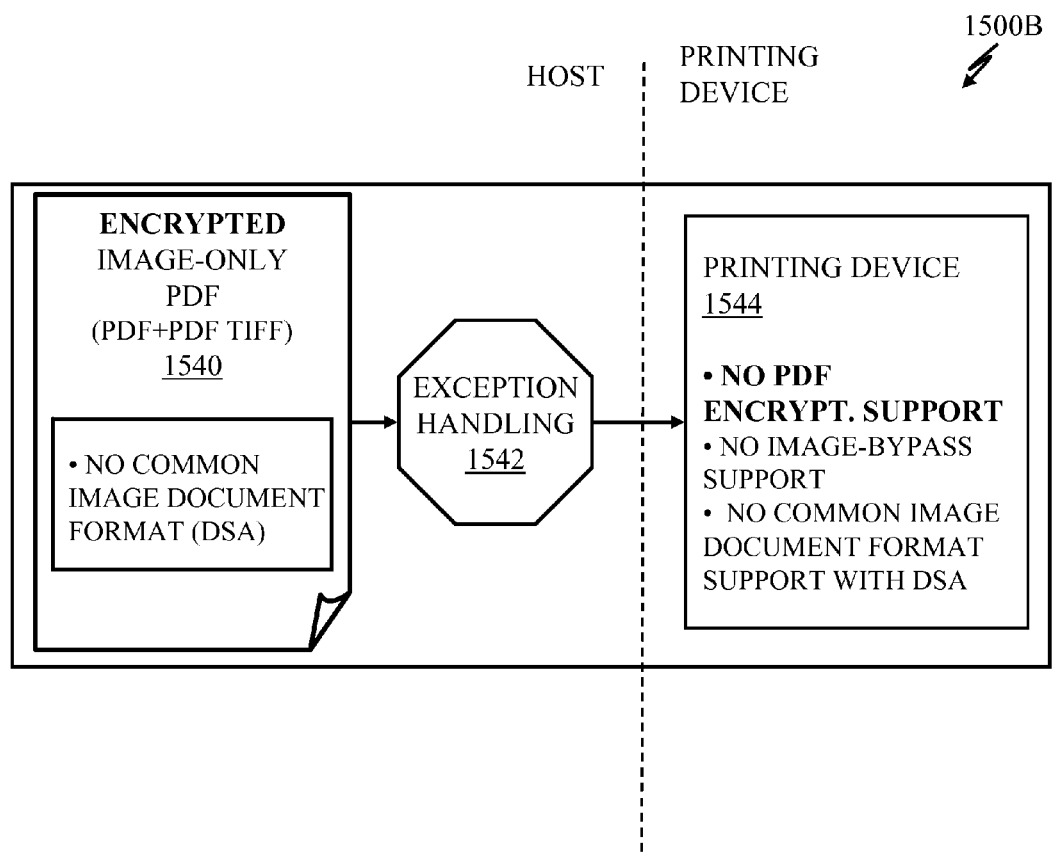

FIGS. 12A and 12B together illustrate another high-level exemplary process of another DSA decryption process 612, which considers whether the printing device is adapted to perform an efficient image-only PDF mode of process, according to some embodiments of the invention. FIG. 13 illustrates exemplary encrypted other PDF documents 222A, i.e., not image-only PDF documents, with exemplary printing device capabilities, according to some embodiments of the invention. FIGS. 14A and 14B together illustrate exemplary image-only PDF documents 224A, with exemplary printing devices adapted to support PDF encryption, according to some embodiments of the invention. FIGS. 15A and 15B together illustrate exemplary image-only PDF documents 224A, with exemplary printing devices not adapted to support PDF encryption, according to some embodiments of the invention. FIGS. 12A, 12B, 13, 14A, 14B, 15A, and 15B in general are discussed together.

Referring to FIG. 12A, in the first operation, the encrypted PDF document (see FIG. 6 operation 610), is decrypted is at the host-side—host-side decryption emulation (operation 1202). Such decryption process, for example, may be performed by the decryption module 128 of the DSA 120. Once the PDF document is decrypted, the DSA 120, particularly the capability query module 126, then determines whether the printing device is adapted to support PDF encryption, e.g., PDF encryption support 312, (decision 1206). If the targeted printing device is adapted to support PDF encryption (decision 1206, "yes" branch), a determination is then made whether the decrypted PDF document is an image-only PDF document (decision 1210). If the decrypted document is not an image-only PDF document, i.e., it is an other PDF document, (decision 1210, "no" branch), typically the original encrypted PDF document received by the DSA, prior to the decryption process (operation 1202), is then transmitted 1218 to the printing device, which may be via a secure or non-secure channel, for decryption (operation 1230) and rendering by the printing device (operation 1240). This exemplary embodiment is exemplified in FIG. 13, wherein an encrypted other PDF document 1310, received by the DSA, is transmitted directly to a printing device with PDF encryption support 1314.

On the other hand, if the printing device is adapted to support PDF encryption (decision 1206, "yes" branch) and the decrypted PDF document is an image-only PDF document (decision 1210, "yes" branch), a check is then made to determine if the printing device supports an efficient mode of image-only PDF process (decision 1214). If the printing device supports an efficient mode of image-only PDF process, e.g., image-by pass support, (decision 1214, "yes" branch), typically the original encrypted PDF document received by the DSA, prior to the decryption process (operation 1202), is then transmitted 1228 to the printing device, which may be via a secure or non-secure channel, for decryption (operation 1230) and rendering by the printing device (operation 1240). This exemplary embodiment is exemplified in FIG. 14A, wherein an encrypted image-only PDF document 1410, received by the DSA, is transmitted directly to a printing device 1414 with PDF encryption support and image-bypass PDF support.

If the device, however, does not support an efficient image-only PDF process, e.g., image-bypass PDF support, (decision 1214, "no" branch), a check is then made to determine whether the printing device is adapted to support a document image format compatible with the embedded PDF image format (decision 1262). If so (decision 1262, "yes" branch), the DSA, e.g., PDF processor/extractor/wrapper module 124, extracts the embedded PDF image and encodes that embedded PDF image into a compatible document image format supported by the printing device (operation 1256). That transformed document is then transmitted (operation 1268), typically via a secure channel, to the printing device for rendering (operation 1290). This exemplary embodiment is exemplified in FIG. 14A, wherein an encrypted image-only PDF document, with an embedded PDF TIFF image 1420, received by the DSA, is decrypted (operation 1202) and then transformed (operation 1256) into an image document with a TIFF document image format, which is then transmitted 1422 to the printing device 1424 adapted to support PDF encryption and image document TIFF format, but no image-bypass support. This transmission is typically via a secure channel, if available.

If the printing device, however, does not support an image document format compatible with the embedded PDF image format (decision 1262, "no" branch), another check is then made to determine if the printing device and the DSA or the conversion module 122 share or support a common format. This generally involves determining whether the DSA is adapted to convert from one document image format to another. If the printing device and the DSA support a common format (decision 1272, "yes branch"), the DSA/PDF processor/extractor/wrapper module 128, extracts the embedded PDF image and converts that embedded PDF image into a transformed image document with the common image format (operation 1276), which is then transmitted (operation 1268) to the printing device for rendering (operation 1290). This exemplary embodiment is exemplified in FIG. 14A, wherein an encrypted image-only PDF document, with an embedded PDF TIFF image 1430, received by the DSA, is decrypted (operation 1202) and then transformed (operation 1256) into an image document with a JPEG document image format 1432, which is then transmitted to the printing device 1434. The DSA 1430 is adapted to convert TIFF to JPEG conversion and the printing device is adapted to support JPEG image document format. The DSA typically extracts the embedded PDF TIFF image, encodes that embedded PDF TIFF image to a document image with JPEG document image format 1432. One of ordinary skill in the art will appreciate that the conversion process may be performed in a number of ways. This transformed image document with JPEG image document format is then transmitted, via a secure channel, if available, to the printing device 1434 which is adapted to support PDF encryption and JPEG image document format but not TFF image document format and not an efficient image-only PDF process—such as no image-bypass mode support.

If there is no common image format supported by the DSA and the printing device, (operation 1272, "no" branch) and exemplified in the exemplary document 1440 in FIG. 14B, an exception-handling procedure 1442 is performed (operation 1282). This exception-handling procedure may include, for example, transmitting the received original encrypted PDF document, prior to the decryption process (operation 1202) or the decrypted PDF document (after operation 1202) to the printing device 1434, sending an alert message to the user, and/or performing printer-driver processing at the host. The printing device 1444 in this exemplary embodiment typically is adapted to support PDF encryption but has no image-bypass support and has no support to a common image format supported by the DSA and the printing device.

If the printing device, however, is not adapted to support PDF encryption (decision 1206, "no" branch), a check is then made whether the decrypted document is an image-only PDF document (decision 1244). If the decrypted document, from the original encrypted document 1320, is not an image-only PDF document, (decision 1244, "no" branch), this decrypted other PDF document 1322 is then transmitted, via a secure channel, if available to the printing device 1324 for rendering 1290. This printing device 1324 is not adapted to support PDF encryption.

If the decrypted document, from the original encrypted PDF document 1510, however, is an image-only PDF document (decision 1244, "yes" branch), a check is then made to determine if the printing device is adapted to support an efficient mode of PDF image-only processing, e.g., image-bypass PDF support (decision 1252). If the printing device is adapted to support, for example, the PDF image-bypass mode (decision 1252, "yes" branch), for example, the decrypted image-only PDF document 1512 is then transmitted (operation 1248) to the printing device 1514 for rendering, such as printing. This exemplary device 1514 is not adapted to support PDF encryption but is adapted to support the image-bypass process.

If the device, however, does not support an efficient image-only PDF process, e.g., image-bypass PDF support, (decision 1214, "no" branch), a check is then made to determine whether the printing device is adapted to support a document image format compatible with the embedded PDF image format (decision 1262). If so (decision 1262, "yes" branch), the DSA, e.g., PDF processor/extractor/wrapper module 124, extracts the embedded PDF image and encodes that embedded PDF image into a compatible document image format supported by the printing device (operation 1256). That transformed document is then transmitted (operation 1268), typically via a secure channel, to the printing device for rendering (operation 1290). This exemplary embodiment is exemplified in FIG. 15A, wherein an encrypted image-only PDF document, with an embedded PDF TIFF image 1520, received by the DSA, is decrypted (operation 1202) and then transformed (operation 1256) into an image document with a TIFF document image format, which is then transmitted to the printing device 1524 adapted the image document TIFF format, but no image-bypass support and no PDF encryption support. This transmission is typically via a secure channel, if available.

If the printing device, however, does not support an image document format compatible with the embedded PDF image format (decision 1262, "no" branch), another check is then made to determine if the printing device and the DSA or the conversion module 122 share or support a common format. This generally involves determining whether the DSA is adapted to convert from one document image format to another. If the printing device and the DSA support a common format (decision 1272, "yes branch), the DSA/PDF processor/extractor/wrapper module 128, extracts the embedded PDF image and converts that embedded PDF image into a transformed image document with the common image format (operation 1276), which is then transmitted (operation 1268) to the printing device for rendering (operation 1290). This exemplary embodiment is exemplified in FIG. 15A, wherein an encrypted image-only PDF document, with an embedded PDF TIFF image 1530, received by the DSA, is decrypted (operation 1202) and then transformed (operation 1256) into an image document with a JPEG document image format, which is then transmitted to the printing device 1534. The DSA 1530 is adapted to convert TIFF to JPEG conversion and the printing device is adapted to support JPEG image document format. The DSA typically extracts the embedded PDF TIFF image, encodes that embedded PDF TIFF image to a document image with JPEG document image format 1532. This transformed image document with JPEG image document format 1532 is then transmitted, via a secure channel, if available, to the printing device 1534 which is adapted to support JPEG image document format but not TFF image document format, not an efficient image-only PDF process— such as no image-bypass mode support, and not TIFF image document format.

If there is no common image format supported by the DSA and the printing device, (operation 1272, "no" branch) and exemplified in the exemplary document 1540 in FIG. 15B, an exception-handling procedure 1542 is performed (operation 1282). This exception-handling procedure 1542 may include, for example, transmitting the received original encrypted PDF document, prior to the decryption process (operation 1202) or the decrypted PDF document (after operation 1202) to the printing device 1534, sending an alert message to the user, and/or performing printer-driver processing at the host. The printing device 1544 in this exemplary embodiment typically has no support for PDF encryption, has no image-bypass support, for example, and has no support to a common image format supported by the DSA and the printing device.

In other embodiments, the DSA is adapted to perform host-emulations of other unsupported features or characteristics, such as, for example:

1. Other compression algorithms or format not supported by the output or rendering device;
2. Bitmap encoding, such as tile versus rows/columns;
3. Other encryption algorithms not supported by the output or rendering device.

As exemplified above, the DSA of the present invention is adapted to handle various PDF documents and image documents, as well as interface with various types of PDF-capable devices and/or image devices. The DSA is also adapted to dynamically adapt its features, particularly its host-emulation processing, based on the formats or features supported in the output or rendering device. In some embodiments the DSA is adapted to determine the native format-handling capabilities of the output device, and thus is adapted to determine whether the DSA or the printer is to perform the process, so as to take advantage of the natively-supported features and efficiency of the rendering or output device.

Embodiments of the present invention may be used in conjunction with networks, systems, and devices that may employ output processing, e.g., imaging, faxing, and printing. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. For example, although some of the examples have been described in relation to printers, other printing devices and other imaging devices, such as multi-function peripherals, copiers, and facsimile machines adapted to render and print output may also be used in the embodiments of the present invention. Furthermore, other efficient image-only PDF processes, not limited to the image-bypass PDF process, may be applied, according to some embodiments of the invention. In addition, while a number of variations of the invention have been shown and described in detail, other modifications, which are within the scope of this invention, will be readily apparent to those of ordinary skill in the art based upon this disclosure. In some embodiments, for example, the order of execution of the operations described herein may be varied or the operations themselves be modified, and yet still be in the scope of the present invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of processing by a host comprising:
   receiving, by the host, an image-only PDF document comprising at least one embedded portable document format (PDF) image with an embedded PDF image format, wherein the image-only PDF document is directed to an imaging device;
   determining, by the host, a set of capabilities associated with the imaging device;
   based on the determined set of capabilities, if the imaging device is adapted to support a device-based image-only PDF process adapted to process image-only PDF documents,
      then transmitting to the imaging device the image-only PDF document for rendering by the imaging device; and
   otherwise, if the imaging device is not adapted to support the device-based image-only PDF process
      but adapted to support an image document format compatible with the embedded PDF image format, then:
         transforming, by the host, the at least one embedded PDF image of the image-only PDF document into a transformed image document with the image document format compatible with the embedded PDF image format; and
         transmitting, by the host, to the imaging device the transformed image document with the image document format compatible with the embedded PDF image format, for rendering by the imaging device.

2. The method of claim 1 wherein the device-based image-only PDF process is an image-bypass PDF process.

3. The method of claim 1 further comprising:
   based on the determined set of capabilities, if the imaging device is not adapted to support the device-based image-only PDF process
      and not adapted to support the image document format compatible with the embedded PDF image format
      but adapted to support an alternate image document format which is also adapted to be converted at the host, then:
         transforming, by the host, the at least one embedded image of the image-only PDF document into a transformed image document with the alternate image document format; and
         transmitting, by the host, to the imaging device the transformed image document with the alternate image document format, for rendering by the imaging device.

4. The method of claim 3 further comprising:
   based on the determined set of capabilities, if the imaging device is not adapted to support the device-based image-only PDF process
      and not adapted to support the image document format compatible with the embedded PDF image format
      and not adapted to support the alternate image document format which is also adapted to be converted at the host
      but adapted to support a PDF format which is not the device-based image-only PDF process,
         then transmitting to the imaging device the image-only PDF document.

5. The method of claim 1, wherein the device-based image-only PDF process comprises:
   extracting the at least one embedded PDF image from the image-only PDF document;
   decoding the extracted embedded PDF image to generate a bitmap image associated with the extracted PDF embedded image; and
   processing the bitmap image into device engine-ready data adapted to be rendered by the imaging device.

6. The method of claim 4, further comprising:
   performing an exception handling procedure.

7. The method of claim 1, wherein the image-only PDF document of the transmitting to the imaging device the image-only PDF document for rendering by the imaging device, is the decrypted image-only PDF document based on the received encrypted image-only PDF document.

8. The method of claim 1, wherein the image-only PDF document of the transmitting to the imaging device the image-only PDF document for rendering by the imaging device, is the received encrypted image-only PDF document.

9. The method of claim 1, wherein transforming the at least one embedded PDF image of the image-only PDF document into a transformed image document with the image document format compatible with the embedded PDF image format is based on the decrypted image-only PDF document.

10. The method of claim 1, further comprising:
    if the received image-only PDF document is an encrypted image-only PDF document associated with a set of security information,
       then decrypting the received image-only PDF document at the host; and
    wherein transforming the at least one embedded image of the image-only PDF document into a transformed image document with the alternate image document format is based on the decrypted image-only PDF document.

11. A method of processing by a host comprising:
    receiving, by the host, an input document directed to an imaging device;
    determining, by the host, a set of capabilities associated with the imaging device;
    determining if the input document is one of the following:
       an image-only PDF document with at least one embedded PDF image with an embedded PDF image format; and
       an image document with an image document format; and if the input document is determined as an image-only PDF document then
    based on the determined set of capabilities, if the imaging device is adapted to support a device-based image-only PDF process adapted to process image-only PDF documents, and
        if the received input document is an encrypted image-only PDF document associated with a set of security information, then
            if the imaging device is adapted to support a PDF encryption, transmitting to the imaging device the encrypted input document; and
            if the imaging device is not adapted to support a PDF encryption, then decrypting the received image-only PDF document at the host, and transmitting to the imaging device the decrypted input document;
        otherwise transmitting to the imaging device the input document for rendering by the imaging device;
    otherwise, if the imaging device is not adapted to support the device-based image-only PDF process but adapted to support an image document format compatible with the embedded PDF image format of the input document, then:
        transforming, by the host, the at least one embedded PDF image of the input document into a transformed image document with the image document format compatible with the embedded PDF image format of the input document; and
        transmitting, by the host, to the imaging device the transformed image document with the image document format compatible with the embedded PDF image format, for rendering by the imaging device;
else, if the input document is determined as an image document then
    based on the determined set of capabilities, if the imaging device is adapted to support the image document format of the input document,
        then transmitting, by the host, to the imaging device the input document;
    otherwise, if the imaging device is not adapted to support the image document format of the input document
    but adapted to support an alternate image document format which is also adapted to be converted at the host, then:
        transforming, by the host, the input document to a transformed image document with the alternate image format; and
        transmitting, by the host, to the imaging device the transformed image document with the alternate image format, for rendering by the imaging device.

12. The method of claim 11, further comprising:
if the input document is determined as an image-only PDF document then
    based on the determined set of capabilities, if the imaging device is not adapted to support the device-based image-only PDF process
        and not adapted to support the image document format compatible with the embedded PDF image format of the input document
        but adapted to support an alternate image document format which is also adapted to be converted at the host:
            transforming, by the host, the at least one embedded PDF image of the input document into a transformed image document with the alternate image document format; and
            transmitting, by the host, to the imaging device the transformed image document with the alternate image document format, for rendering by the imaging device.

13. The method of claim 11 further comprising:
if the input document is determined as an image document, then
    based on the determined set of capabilities, if the imaging device is not adapted to support the image document format of the input document
        and not adapted to support an alternate image document format which is also adapted to be converted at the host
        but adapted to support a PDF format with an embedded PDF image format compatible with the image document format of the input document which is also adapted to be converted at the host, then:
            transforming, by the host, the input document to an embedded PDF image with the embedded PDF image format compatible with the image document format of the input document and coding the embedded PDF image as an image-only PDF document; and
            transmitting, by the host, to the imaging device the image-only PDF document, for rendering by the imaging device.

14. A device comprising:
a receiver module adapted to:
    receive an input document directed to an imaging device; and
    determine if the input document is one of the following:
        an image-only PDF document with at least one embedded PDF image with an embedded PDF image format; and
        an image document with an image document format;
a capability query module adapted to:
    determine a set of capabilities associated with the imaging device; and
a direct submit application module (DSA) adapted to:
    if the input document is determined as an image-only PDF document:
        based on the determined set of capabilities, if the imaging device is adapted to support a device-based image-only PDF process adapted to process image-only PDF documents, and
            if the input document is an encrypted image-only PDF document associated with a set of security information, then
                if the imaging device is adapted to support a PDF encryption, transmit to the imaging device the encrypted input document; and
                if the imaging device is not adapted to support a PDF encryption,
                    then decrypt the image-only PDF document at the host, and transmit to the imaging device the decrypted input document;
        otherwise, if the imaging device is not adapted to support the device-based image-only PDF process but adapted to support an image document format compatible with the embedded PDF image format of the input document,
            then transform the at least one embedded PDF image of the input document into a transformed image document with the image document format compatible with the embedded PDF image format of the input document; and transmit to the imaging device the transformed image document with the image document format compatible with the embedded PDF image format; and if the input document is determined as an image document:

based on the determined set of capabilities, if the imaging device is adapted to support the image document format of the input document, then transmit to the imaging device the input document; and otherwise, if the imaging device is not adapted to support the image document format of the input document but adapted to support an alternate image document format which is also adapted to be converted by the DSA, then transform the input document to a transformed image document with the alternate image format; and transmit to the imaging device the transformed image document with the alternate image format.

15. The device of claim 14, wherein the DSA is further adapted to:

if the input document is determined as an image-only PDF document then based on the determined set of capabilities, if the imaging device is not adapted to support the device-based image-only PDF process and not adapted to support the image document format compatible with the embedded PDF image format but adapted to support an alternate image document format which is also adapted to be converted at the DSA, then:

transform the at least one embedded PDF image of the input document into a transformed image document with the alternate image document format; and transmit to the imaging device the transformed image document with the alternate image document format.

16. The device of claim 14, wherein the DSA is further adapted to:

if the input document is determined as an image document then based on the determined set of capabilities, if the imaging device is not adapted to support the image document format of the image document and not adapted to support an alternate image document format which is also adapted to be converted at the host but adapted to support a PDF format with an embedded PDF image format compatible with the image document format of the image document which is also adapted to be converted at the host, then:

transform the input document to an embedded PDF image with the embedded PDF image format compatible with the image document format of the input document and code the embedded PDF image as an image-only PDF document; and transmit to the imaging device the image-only PDF document.

* * * * *